(12) United States Patent
Li et al.

(10) Patent No.: US 11,064,465 B2
(45) Date of Patent: Jul. 13, 2021

(54) COMMUNICATION METHOD AND COMMUNICATIONS APPARATUS

(71) Applicant: HUAWEI TECHNOLOGIES CO., LTD., Guangdong (CN)

(72) Inventors: Chao Li, Beijing (CN); Xingwei Zhang, Beijing (CN); Jie Shi, Shenzhen (CN); Zhe Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/578,977

(22) Filed: Sep. 23, 2019

(65) Prior Publication Data
US 2020/0022127 A1    Jan. 16, 2020

Related U.S. Application Data

(63) Continuation of application No. PCT/CN2018/080333, filed on Mar. 23, 2018.

(30) Foreign Application Priority Data

Mar. 23, 2017    (CN) .......................... 201710179572.4

(51) Int. Cl.
*H04W 72/04* (2009.01)
*H04B 1/713* (2011.01)
*H04L 5/00* (2006.01)

(52) U.S. Cl.
CPC ........ *H04W 72/0406* (2013.01); *H04B 1/713* (2013.01); *H04L 5/0048* (2013.01); *H04W 72/044* (2013.01)

(58) Field of Classification Search
CPC ............. H04W 72/04; H04W 72/0406; H04W 72/044; H04L 5/00; H04L 5/0048; H04B 1/713
See application file for complete search history.

(56) References Cited

U.S. PATENT DOCUMENTS

2007/0064770 A1    3/2007  Horiguchi
2009/0176514 A1    7/2009  Choi et al.
(Continued)

FOREIGN PATENT DOCUMENTS

CN    101771438 A    7/2010
CN    101867403 A    10/2010
(Continued)

OTHER PUBLICATIONS

3GPP TS 36.213 V14.1.0 (Dec. 2016), "3rd Generation Partnership Project; Technical Specification Group Radio Access Network; Evolved Universal Terrestrial Radio Access (E-UTRA); Physical layer procedures (Release 14)," Dec. 2016, 414 pages.
3GPP TS 36.211 V14.1.0 (Dec. 2016), "3rd Generation Partnership Project; Technical Specification Group Radio Access Network; Evolved Universal Terrestrial Radio Access (E-UTRA); Physical channels and modulation (Release 14)," Dec. 2016, 175 pages.
(Continued)

*Primary Examiner* — Chi Ho A Lee
(74) *Attorney, Agent, or Firm* — Fish & Richardson P.C.

(57) ABSTRACT

A transmit end obtains a frequency hopping parameter and resource allocation information of a to-be-transmitted message, where the frequency hopping parameter includes at least one of bandwidth part indication information, beam indication information, reference signal configuration information, subcarrier spacing indication information, transmission waveform indication information, slot type indication information, channel type indication information, or transmission carrier indication information. The transmit end determines, based on the resource allocation information and the frequency hopping parameter, a physical resource used to send the to-be-transmitted message, where the physical resource includes information about a frequency domain resource on which the to-be-transmitted message is mapped in at least one time unit. The transmit end sends the to-be-transmitted message by using the physical resource.

20 Claims, 14 Drawing Sheets

(56) References Cited

U.S. PATENT DOCUMENTS

| | | | |
|---|---|---|---|
| 2009/0316758 | A1 | 12/2009 | Ahn et al. |
| 2015/0023307 | A1* | 1/2015 | Futagi .................. H04L 1/0016 |
| | | | 370/329 |
| 2015/0079981 | A1* | 3/2015 | Zhu ........................ H04W 8/06 |
| | | | 455/434 |
| 2015/0304006 | A1* | 10/2015 | Ro ........................ H04W 72/04 |
| | | | 370/329 |
| 2016/0353410 | A1* | 12/2016 | Wang ................ H04W 72/1289 |
| 2017/0064694 | A1* | 3/2017 | Wang ................ H04W 72/1278 |
| 2017/0134935 | A1* | 5/2017 | Wei ........................ H04B 1/713 |
| 2017/0135105 | A1 | 5/2017 | Li et al. |
| 2019/0081660 | A1 | 3/2019 | Han et al. |
| 2019/0166619 | A1* | 5/2019 | Takeda ................ H04B 1/7143 |
| 2019/0173522 | A1* | 6/2019 | Sun ........................ H04W 52/02 |
| 2020/0008203 | A1 | 1/2020 | Xia et al. |

FOREIGN PATENT DOCUMENTS

| | | |
|---|---|---|
| CN | 103298117 A | 9/2013 |
| CN | 103379635 A | 10/2013 |
| CN | 103517426 A | 1/2014 |
| CN | 104283582 A | 1/2015 |
| CN | 105099634 A | 11/2015 |
| CN | 105338518 A | 2/2016 |
| CN | 105338641 A | 2/2016 |
| CN | 106455097 A | 2/2017 |
| CN | 106506127 A | 3/2017 |
| CN | 104186020 B | 11/2017 |
| WO | 2016015664 A1 | 2/2016 |
| WO | 2016164028 A1 | 10/2016 |
| WO | 2016192048 A1 | 12/2016 |

OTHER PUBLICATIONS

Office Action issued in Chinese Application No. 201710179572.4 dated Jan. 21, 2020, 8 pages.
Partial Supplementary European Search Report issued in European Application No. 18770870.6 dated Mar. 4, 2020, 14 pages.
PCT Search Report and Written Opinion issued in International Application No. PCT/CN2018/080333 dated Jun. 27, 2018, 17 pages (with English translation).
R1-152706—LG Electronics, "Considerations on CSI for low complexity UEs," 3GPP TSG RAN WG1 Meeting #81, Fukuoka, Japan, May 25-29, 2015, 6 pages.
R1-105901—Texas Instruments, "On Frequency Hopping for Aperiodic SRS Transmission," 3GPP TSG RAN WG1 163, Jacksonville, USA, Nov. 15-19, 2010, 5 pages.
Intel Corporation, "On slot aggregation for data transmission", 3GPP TSG RAN WG1 Meeting #88, R1-1702239, XP051209397, Athens, Greece, Feb. 13-17, 2017, 4 pages.
NTT Docomo et al., "UL control channel structure in long duration", 3GPP TSG RAN WG1 AH_NR Meeting; R1-1700623, XP051208148, Spokane, USA, Jan. 16-20, 2017, 6 pages.
Extended European Search Report issued in European Application No. 18770870.6 dated Jul. 15, 2020, 14 pages.
Office Action issued in Chinese Application No. 201710179572.4 dated Nov. 12, 2020, 16 pages (with English translation).
LG Electronics, "Remaining issues for D2D control and data transmission," 3GPP TSG RAN WG1 Meeting #78bis, R1-144027, Ljubljana, Slovenia, Oct. 6-10, 2014, 5 pages.
Office Action issued in Chinese Application No. 201880020200.X dated May 8, 2021, 10 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/080333, filed Mar. 23, 2018, which claims priority to Chinese Patent Application No. 201710179572.4, filed on Mar. 23, 2017. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

In a wireless communications system, reliability and transmission performance of a wireless transmission are an important research direction in the industry. When performing a wireless transmission, a terminal needs to maximize reliability and transmission performance of the wireless transmission as much as possible. As shown in FIG. 1, signal levels in different frequency bands may rise and fall. When a frequency band occupied by a terminal is at a frequency domain location with a relatively low level, communication performance is very poor. For an application scenario such as semi-persistent scheduling (SPS), multi-subframe scheduling, and a multi-subframe retransmission in which one piece of scheduling information triggers a plurality of transmissions, or a scenario in which there are a plurality of time domain transmission resources for one data packet, if a frequency band that is occupied by a terminal is always at a frequency with a relatively low signal level, performance of a plurality of transmissions of the terminal is very poor.

A method for optimizing wireless transmission performance is a frequency hopping transmission. In the frequency hopping transmission, to-be-transmitted data of a same terminal is not transmitted at a fixed frequency, to avoid a problem that transmission performance of the terminal keeps very poor when a frequency is in deep fading.

In a 5th generation (5G) communications system, a baseband transmission bandwidth supported by a system on a single carrier can be up to 400 MHz, in other words, a maximum system bandwidth can be 400 MHz. Terminals of different capability types support different baseband bandwidths. Some terminals can support an entire system bandwidth. These terminals may be referred to as high-bandwidth terminals. However, some terminals can support only a part of the system bandwidth. These terminals may be referred to as low-bandwidth terminals. The 5G communications system requires that the low-bandwidth terminals and the high-bandwidth terminals can work simultaneously. A prior-art frequency hopping transmission solution is designed based on a case in which a terminal can perform communication on an entire system bandwidth. If a low-bandwidth terminal performs, based on the prior-art frequency hopping transmission solution, a frequency hopping transmission on a part of a system bandwidth supported by the low-bandwidth terminal, and a high-bandwidth terminal performs, based on the prior-art frequency hopping transmission solution, a frequency hopping transmission on an entire system bandwidth supported by the high-bandwidth terminal, there is a problem that transmission resources collide for different terminals in terms of bandwidths. To avoid a collision of transmission resources, more resources need to be reserved. Consequently, more unusable resource fragments are generated.

How to design a unified frequency hopping solution for both a low-bandwidth terminal and a high-bandwidth terminal so that the two types of terminals can simultaneously multiplex time-frequency resources of an entire system is a problem that needs to be resolved.

SUMMARY

Embodiments of this application provide a communication method and a communications apparatus, to resolve a problem that a collision occurs when terminals having different baseband bandwidth supporting capabilities multiplex transmission resources.

The specific technical solutions provided in the embodiments of this application are as follows:

According to a first aspect, a communication method is provided, where the method is applied to a transmit end and includes: obtaining a frequency hopping parameter and resource allocation information of a to-be-transmitted message, where the frequency hopping parameter includes at least one of bandwidth part indication information, beam indication information, reference signal configuration information, subcarrier spacing indication information, transmission waveform indication information, slot type indication information, channel type indication information, and transmission carrier indication information; determining, based on the resource allocation information and the frequency hopping parameter, a physical resource used to send the to-be-transmitted message, where the physical resource includes information about a frequency domain resource on which the to-be-transmitted message is mapped in at least one time unit; and sending the to-be-transmitted message by using the physical resource. In this way, a unified frequency hopping solution may be designed when terminals of different bandwidth capability types coexist, where the frequency hopping solution is a method for determining a physical resource, so that a collision between transmission resources and a scheduled resource fragment are reduced.

In a possible design, the frequency hopping parameter includes the bandwidth part indication information; and the determining the physical resource based on the resource allocation information and the frequency hopping parameter is implemented in the following manner: determining a first frequency domain resource value in one bandwidth part based on the resource allocation information and the bandwidth part indication information; determining a second frequency domain resource value in the bandwidth part based on the resource allocation information and the bandwidth part indication information; and then determining the physical resource based on the first frequency domain resource value and/or the second frequency domain resource value. In this way, a to-be-transmitted message can be further transmitted between several bandwidth parts based on an intra-bandwidth part frequency hopping manner, to obtain a better frequency diversity gain.

In a possible design, the determining the physical resource based on the first frequency domain resource value and/or the second resource frequency domain location is implemented in the following manner: determining an initial value of a first random sequence based on the first frequency domain resource value and/or the second frequency domain resource value, generating the first random sequence, and determining the physical resource based on the first random sequence.

In a possible design, the determining a first frequency domain resource value in a bandwidth part based on the resource allocation information and the bandwidth part indication information is implemented in the following manner: determining the first frequency domain resource value in the bandwidth part based on the resource allocation information in a predefined intra-bandwidth part frequency hopping manner.

In a possible design, the frequency hopping parameter includes the bandwidth part indication information; and the determining the physical resource based on the resource allocation information and the frequency hopping parameter is implemented in the following manner: determining the physical resource based on the resource allocation information, the bandwidth part indication information, and a frequency domain offset value.

In a possible design, the frequency hopping parameter includes the bandwidth part indication information, and the bandwidth part indication information includes a bandwidth part quantity and/or a bandwidth part index; and the determining the physical resource based on the resource allocation information and the frequency hopping parameter is implemented in the following manner: determining the physical resource based on the resource allocation information and the bandwidth part quantity and/or the bandwidth part index.

In a possible design, the determining the physical resource based on the resource allocation information and the bandwidth part quantity and/or the bandwidth part index is implemented in the following manner: determining the physical resource based on the resource allocation information, an index of a time domain resource and/or a frequency domain resource used to send the to-be-transmitted message, and the bandwidth part quantity and/or the bandwidth part index.

In a possible design, the bandwidth part quantity includes any one of the following: a quantity of bandwidth parts included in a carrier bandwidth of the transmit end, a quantity of bandwidth parts that can be supported by the transmit end, and a quantity of bandwidth parts allocated to the transmit end.

In a possible design, the resource allocation information includes a third frequency domain resource value in one bandwidth part; and when a bandwidth occupied by the to-be-transmitted message is greater than one bandwidth part, the physical resource for transmitting the to-be-transmitted message is determined based on the third frequency domain resource value from all bandwidth parts configured for the transmit end. In this way, when a bandwidth for one transmission of the transmit end is relatively wide, the transmit end only performs overall frequency hopping of a frequency shift in a bandwidth part seen by the transmit end. This can reduce complexity of frequency hopping, and facilitate control of a resource location of the transmit end after the frequency hopping. When the transmit end is a terminal, a frequency hopping effect can be achieved, and prediction performed by a base station on a resource location of the terminal after frequency hopping can also be facilitated.

In a possible design, the determining the physical resource based on the resource allocation information, index of the time domain resource and/or the frequency domain resource used to send the to-be-transmitted message, and the bandwidth part quantity and/or the bandwidth part index is implemented in the following manner: determining an initial value of a second random sequence based on the resource allocation information, the index of the time domain resource and/or the frequency domain resource used to send the to-be-transmitted message, and the bandwidth part quantity, generating the second random sequence, and determining the physical resource based on the second random sequence.

In a possible design, the bandwidth part indication information includes at least one of the following: indication information of a bandwidth part occupied by the to-be-transmitted message, a size of a bandwidth part in the carrier bandwidth of the transmit end, and a quantity of bandwidth parts included in the carrier bandwidth of the transmit end.

In a possible design, the frequency hopping parameter includes at least one of the beam indication information, the reference signal configuration information, the subcarrier spacing indication information, the transmission waveform indication information, the slot type indication information, the channel type indication information, and the transmission carrier indication information.

In a possible design, the determining, based on the resource allocation information and the frequency hopping parameter, a physical resource used to send the to-be-transmitted message is implemented in the following manner: determining the physical resource based on the resource allocation information, the frequency hopping parameter, and a frequency domain offset value; or determining an initial value of a third random sequence based on the resource allocation information and the frequency hopping parameter, generating the third random sequence, and determining the physical resource based on the third random sequence.

In a possible design, the time unit includes at least one slot, or the time unit includes at least one symbol in one slot.

In a possible design, if the time unit includes at least one symbol in one slot, the determining, based on the resource allocation information and the frequency hopping parameter, a physical resource used to send the to-be-transmitted message is implemented in the following manner: determining a frequency domain resource location at which the to-be-transmitted message is mapped in different symbols in one slot, where one slot includes a first part and a second part in time domain, the first part includes first reference signals and a first data symbol, the second part includes a second data symbol, and the different symbols in the slot include the first data symbol and the second data symbol.

In a possible design, the first data symbol is located at a fourth frequency domain resource location, and the second data symbol is located at a fifth frequency domain resource location; and the first reference signals are separately located at the fourth frequency domain resource location and the fifth frequency domain resource location in frequency domain.

In a possible design, the second part further includes a second reference signal.

In a possible design, the second reference signal is located at a time domain start location of the second part.

In a possible design, the time unit includes at least two slots; and the sending the to-be-transmitted message by using the physical resource is implemented in the following manner: sending the to-be-transmitted message in a manner of binding reference signals in the at least two slots and by using a same frequency domain resource.

In a possible design, if the index of the time domain resource used to send the to-be-transmitted message is used for determining the physical resource, the index of the time domain resource used to send the to-be-transmitted message is determined by using indexes of slots in which the reference signals are bound and a quantity of slots in which the reference signals are bound.

In a possible design, a frequency hopping type is obtained, where the frequency hopping type is used to indicate a manner of determining a physical resource used by the transmit end to obtain the to-be-transmitted message.

In a possible design, the frequency hopping type is obtained by using at least one of the following indication information: indication information of a bandwidth part allocated to the transmit end and indication information of resource allocation in a bandwidth part.

In a possible design, the to-be-transmitted message includes at least one of the following: data, control information, and a reference signal.

In a possible design, different values of the frequency hopping parameter are associated with different configuration parameters for determining the physical resource used by the to-be-transmitted message, or different values of the frequency hopping parameter are associated with different frequency hopping types, and the frequency hopping type is used to indicate a manner of determining a physical resource used by the transmit end to obtain the to-be-transmitted message. In this way, different configuration parameters or frequency hopping types are configured for different values of the frequency hopping parameter, to implement a pertinent optimized frequency hopping solution for the different values of the frequency hopping parameter, thereby achieving an optimal transmission effect.

In a possible design, the bandwidth part indication information is predefined, or the bandwidth part indication information is determined by using a second signaling indication.

In a possible design, before the physical resource used by the to-be-transmitted message is determined based on the resource allocation information and the frequency hopping parameter, indication information is obtained, where the indication information is used to instruct the transmit end to determine, in a bandwidth part, the physical resource used by the to-be-transmitted message, or the indication information is used to instruct the transmit end to determine, between bandwidth parts, the physical resource used by the to-be-transmitted message. In this way, different frequency hopping manners are used for intra-bandwidth part frequency hopping and inter-bandwidth part frequency hopping, and a corresponding frequency hopping solution may be provided for terminals of different bandwidth capability types, so that a system can support the terminals of the different bandwidth capability types in simultaneously performing frequency hopping, thereby improving system flexibility and communication efficiency.

According to a second aspect, a communication method is provided, where the method is applied to a receive end and includes: obtaining a frequency hopping parameter and resource allocation information of a to-be-demodulated message, where the frequency hopping parameter includes at least one of bandwidth part indication information, beam indication information, reference signal configuration information, subcarrier spacing indication information, transmission waveform indication information, slot type indication information, channel type indication information, and transmission carrier indication information; determining, based on the resource allocation information and the frequency hopping parameter, a physical resource used by the to-be-demodulated message, where the physical resource includes information about a frequency domain resource on which the to-be-demodulated message is mapped in at least one time unit; and demodulating the to-be-demodulated message by using the physical resource. In this way, a unified frequency hopping solution may be designed when terminals of different bandwidth capability types coexist, where the frequency hopping solution is a method for determining a physical resource, so that a collision between transmission resources and a scheduled resource fragment are reduced.

In a possible design, the frequency hopping parameter includes the bandwidth part indication information; and the determining the physical resource based on the resource allocation information and the frequency hopping parameter is implemented in the following manner: determining a first frequency domain resource value in one bandwidth part based on the resource allocation information and the bandwidth part indication information; determining a second frequency domain resource value in the bandwidth part based on the resource allocation information and the bandwidth part indication information; and determining the physical resource based on the first frequency domain resource value and/or the second frequency domain resource value. In this way, a to-be-transmitted message can be further transmitted between several bandwidth parts based on an intra-bandwidth part frequency hopping manner, to obtain a better frequency diversity gain.

In a possible design, the determining the physical resource based on the first frequency domain resource value and/or the second resource frequency domain location is implemented in the following manner: determining an initial value of a first random sequence based on the first frequency domain resource value and/or the second frequency domain resource value, generating the first random sequence, and determining the physical resource based on the first random sequence.

In a possible design, the determining a first frequency domain resource value in a bandwidth part based on the resource allocation information is implemented in the following manner: determining the first frequency domain resource value in the bandwidth part based on the resource allocation information in a predefined intra-bandwidth part frequency hopping manner.

In a possible design, the frequency hopping parameter includes the bandwidth part indication information; and the determining the physical resource based on the resource allocation information and the frequency hopping parameter is implemented in the following manner: determining the physical resource based on the resource allocation information, the bandwidth part indication information, and a frequency domain offset value.

In a possible design, the frequency hopping parameter includes the bandwidth part indication information, and the bandwidth part indication information includes a bandwidth part quantity and/or a bandwidth part index; and the determining the physical resource based on the resource allocation information and the frequency hopping parameter is implemented in the following manner: determining the physical resource based on the resource allocation information and the bandwidth part quantity and/or the bandwidth part index.

In a possible design, the determining the physical resource based on the resource allocation information and the bandwidth part quantity and/or the bandwidth part index is implemented in the following manner: determining the physical resource based on the resource allocation information, an index of a time domain resource and/or a frequency domain resource used to send the to-be-demodulated message, and the bandwidth part quantity and/or the bandwidth part index.

In a possible design, the bandwidth part quantity includes any one of the following: a quantity of bandwidth parts included in a carrier bandwidth of the receive end, a quantity of bandwidth parts that can be supported by the receive end, and a quantity of bandwidth parts allocated to the receive end.

In a possible design, the resource allocation information includes a third frequency domain resource value in one bandwidth part; and when a bandwidth occupied by the to-be-demodulated message is greater than one bandwidth part, the physical resource used by the to-be-demodulated message is determined based on the third frequency domain resource value from all bandwidth parts configured for the receive end. In this way, when a bandwidth for one transmission of a transmit end is relatively wide, the transmit end only performs overall frequency hopping of a frequency shift in a bandwidth part seen by the transmit end. This can reduce complexity of frequency hopping, and facilitate control of a resource location of the transmit end after the frequency hopping. When the transmit end is a terminal, a frequency hopping effect can be achieved, and prediction performed by a base station on a resource location of the terminal after frequency hopping can also be facilitated.

In a possible design, the determining the physical resource based on the resource allocation information, index of the time domain resource and/or the frequency domain resource used to send the to-be-demodulated message, and the bandwidth part quantity and/or the bandwidth part index is implemented in the following manner: determining an initial value of a second random sequence based on the resource allocation information, index of the time domain resource and/or the frequency domain resource used to send the to-be-demodulated message, and the bandwidth part quantity, generating the second random sequence, and determining the physical resource based on the second random sequence.

In a possible design, the bandwidth part indication information includes at least one of the following: indication information of a bandwidth part occupied by the to-be-demodulated message, a size of a bandwidth part in a carrier bandwidth carrying the to-be-demodulated message, and a quantity of bandwidth parts included in the carrier bandwidth carrying the to-be-demodulated message.

In a possible design, the frequency hopping parameter includes at least one of the beam indication information, the reference signal configuration information, the subcarrier spacing indication information, the transmission waveform indication information, the slot type indication information, the channel type indication information, and the transmission carrier indication information.

In a possible design, the determining, based on the resource allocation information and the frequency hopping parameter, a physical resource used by the to-be-demodulated message is implemented in the following manner: determining the physical resource based on the resource allocation information, the frequency hopping parameter, and a frequency domain offset value; or determining an initial value of a third random sequence based on the resource allocation information and the frequency hopping parameter, generating the third random sequence, and determining the physical resource based on the third random sequence.

In a possible design, the time unit includes at least one slot, or the time unit includes at least one symbol in one slot.

In a possible design, if the time unit includes at least one symbol in one slot, the determining, based on the resource allocation information and the frequency hopping parameter, a physical resource used by the to-be-demodulated message is implemented in the following manner: determining a frequency domain resource location at which the to-be-demodulated message is mapped in different symbols in one slot, where one slot includes a first part and a second part in time domain, the first part includes first reference signals and a first data symbol, the second part includes a second data symbol, and the different symbols in the slot include the first data symbol and the second data symbol.

In a possible design, the first data symbol is located at a fourth frequency domain resource location, and the second data symbol is located at a fifth frequency domain resource location; and the first reference signals are separately located at the fourth frequency domain resource location and the fifth frequency domain resource location in frequency domain.

In a possible design, the second part further includes a second reference signal.

In a possible design, the second reference signal is located at a time domain start location of the second part.

In a possible design, the time unit includes at least two slots; and the demodulating the to-be-demodulated message by using the physical resource is implemented in the following manner: demodulating the to-be-demodulated message in a manner of binding reference signals in the at least two slots and by using a same frequency domain resource.

In a possible design, if the index of the time domain resource used to demodulate the to-be-demodulated message is used for determining the physical resource, the index of the time domain resource used to demodulate the to-be-demodulated message is determined by using indexes of slots in which the reference signals are bound and a quantity of slots in which the reference signals are bound.

In a possible design, a frequency hopping type is obtained, where the frequency hopping type is used to indicate a manner of determining a physical resource used by the receive end to obtain the to-be-demodulated message.

In a possible design, the frequency hopping type is obtained by using at least one of the following indication information: indication information of a bandwidth part of the to-be-demodulated message and indication information of resource allocation in a bandwidth part of the to-be-demodulated message.

In a possible design, the to-be-demodulated message includes at least one of the following: data, control information, and a reference signal.

In a possible design, different values of the frequency hopping parameter are associated with different configuration parameters for determining the physical resource used by the to-be-demodulated message, or different values of the frequency hopping parameter are associated with different frequency hopping types, and the frequency hopping type is used to indicate a manner of determining a physical resource used by the receive end to obtain the to-be-demodulated message. In this way, different configuration parameters or frequency hopping types are configured for different values of the frequency hopping parameter, to implement a pertinent optimized frequency hopping solution for the different values of the frequency hopping parameter, thereby achieving an optimal transmission effect.

In a possible design, the bandwidth part indication information is predefined, or the bandwidth part indication information is determined by using a second signaling indication.

In a possible design, before the physical resource used by the to-be-demodulated message is determined based on the resource allocation information and the frequency hopping parameter, indication information is obtained, where the indication information is used to instruct the receive end to determine, in a bandwidth part, the physical resource used by the to-be-demodulated message, or the indication information is used to instruct the receive end to determine, between bandwidth parts, the physical resource used by the to-be-demodulated message. In this way, different frequency hopping manners are used for intra-bandwidth part frequency hopping and inter-bandwidth part frequency hopping, and a corresponding frequency hopping solution may be provided for terminals of different bandwidth capability types, so that a system can support the terminals of the different bandwidth capability types in simultaneously performing frequency hopping, thereby improving system flexibility and communication efficiency.

According to a third aspect, a reference signal sending method is provided, where the method is applied to a transmit end and includes: determining a reference signal sequence based on a first parameter, where the first parameter includes at least one of the following: bandwidth part indication information, beam indication information, reference signal configuration information, subcarrier spacing indication information, transmission waveform indication information, slot type indication information, channel type indication information, and transmission carrier indication information; generating a reference signal by using the reference signal sequence; and sending the reference signal. In this way, different reference signals may be generated when any one or more of the first parameters have different values, so that interference between sequences can be reduced or randomized for the reference signals. For example, when terminals with different beams generate reference signals, reference signal sequences generated by the terminals are different, thereby reducing sequence interference between the terminals with different beams and a same time-frequency resource.

In a possible design, the determining a reference signal sequence based on a first parameter is implemented in the following manner: determining a second parameter based on the first parameter, where the second parameter includes at least one of the following: a cyclic shift value, an orthogonal sequence index, a root sequence index, and an initial value; and determining the reference signal sequence based on the second parameter.

In a possible design, the second parameter includes the cyclic shift value; and correspondingly, the determining a second parameter based on the first parameter is implemented in the following manner: determining the cyclic shift value based on the first parameter and a third parameter, where the third parameter includes at least one of the following: an indication value of the cyclic shift value, resource indication information for sending the reference signal, an orthogonal sequence index for generating the reference signal, a root sequence index for generating the reference signal, and a spreading factor value for generating the reference signal.

In a possible design, the determining a second parameter based on the first parameter is implemented in the following manner: determining a cell-specific cyclic shift value by using the first parameter; and determining the cyclic shift value by using the cell-specific cyclic shift value.

In a possible design, the determining a cell-specific cyclic shift value by using the first parameter is implemented in the following manner: determining an initial value of a random sequence by using the first parameter; and generating the cell-specific cyclic shift value by using the random sequence.

In a possible design, the cyclic shift value is determined by using the cell-specific cyclic shift value and the third parameter.

In a possible design, the orthogonal sequence index is determined by using the first parameter and a fourth parameter, and the fourth parameter includes at least one of the following: an indication value of the orthogonal sequence index, resource indication information for sending the reference signal, the cyclic shift value for generating the reference signal, a root sequence index for generating the reference signal, and a spreading factor value for generating the reference signal.

In a possible design, the root sequence index is determined by using the first parameter and a fifth parameter, and the fifth parameter includes at least one of the following: an indication value of the root sequence index, resource indication information for sending the reference signal, the cyclic shift value for generating the reference signal, an orthogonal sequence index for generating the reference signal, and a spreading factor value for generating the reference signal.

In a possible design, the second parameter includes the root sequence index; and the determining a second parameter based on the first parameter is implemented in the following manner: determining an initial value of a random sequence by using the first parameter; and generating the root sequence index by using the random sequence.

In a possible design, the second parameter includes the root sequence index; and the determining a second parameter based on the first parameter is implemented in the following manner: determining a sequence hop and/or a group hop by using the first parameter; and determining the root sequence index by using the sequence hop and/or the group hop.

In a possible design, the group hop includes: determining a sequence group number and/or a group hop pattern by using the first parameter, and determining the group hop by using the sequence group number and/or the group hop pattern.

In a possible design, the reference signal includes at least one of the following: a sounding reference signal, a demodulation reference signal, a positioning reference signal, a phase tracking reference signal, channel state information reference information, and a reference signal for transmitting control information.

According to a fourth aspect, a control information sending method is provided, where the method is applied to a transmit end and includes: obtaining control information; mapping the control information and a first reference signal to a symbol that carries the control information, where the first reference signal is used to demodulate the control information; and sending the symbol, where the control information and the first reference signal are time division or frequency division multiplexed in the symbol. In this way, an SRS and a PUCCH can be simultaneously sent, and an opportunity of preferably sending UCI can also be ensured.

In a possible design, the sending the symbol is implemented in the following manner: sending the symbol after spectrum spreading is performed for the control information by using a first frequency domain spreading factor.

In a possible design, a second reference signal is mapped to the symbol that carries the control information, where the first reference signal and the second reference signal are frequency division multiplexed in the symbol.

In a possible design, the sending the symbol is implemented in the following manner: sending the symbol after spectrum spreading is performed for the control information by using a second frequency domain spreading factor.

In a possible design, the second spreading factor is less than the first spreading factor.

In a possible design, the second reference signal occupies a frequency domain resource on which the first reference signal is located.

In a possible design, the first reference signal and the second reference signal are code division multiplexed, or one of the first reference signal and the second reference signal is not sent.

In a possible design, the mapping the control information and a first reference signal to a symbol that carries the control information is implemented in the following manner: after the control information arranged according to a preset rule and the first reference signal are converted into frequency domain signals, mapping the frequency domain signals to frequency domain resources corresponding to the symbol.

In a possible design, the mapping the frequency domain signals to frequency domain resources corresponding to the symbol is implemented in the following manner: mapping the frequency domain signals to a subcarrier on which the second reference signal is not located and that is on the frequency domain resource corresponding to the symbol.

In a possible design, transmit power is allocated based on priorities when the transmit power is limited, where a descending order of the priorities is from the control information to the second reference signal.

In a possible design, transmit power is allocated based on priorities when the transmit power is limited, where an order of priorities of the control information and the second reference signal is determined based on a message type included in the control information.

In a possible design, when transmit power is limited, the second reference signal is discarded, and the control information is sent.

In a possible design, when transmit power is limited, the second reference signal is discarded, and information with a higher priority in the control information is sent.

In a possible design, the symbol includes a first time domain resource and a second time domain resource; and the sending the symbol is implemented in the following manner: when transmit power is limited, mapping the control information and the first reference signal to the first time domain resource for sending, and mapping the second reference signal to the second time domain resource for sending.

In a possible design, the symbol includes a first time domain resource and a second time domain resource; and the sending the symbol is implemented in the following manner: when transmit power is limited, mapping a first part of the control information and the first reference signal to the first time domain resource for sending, and mapping a second part of the control information and the second reference signal to the second time domain resource for sending.

In a possible design, a quantity of symbols that carry the control information is 1 or 2.

In a possible design, the quantity of symbols that carry the control information is 2, the first reference signal is in the first symbol, and the control information and the second reference signal are in the second symbol.

In a possible design, the second reference signal is any one of the following: a sounding reference signal, a demodulation reference signal, a positioning reference signal, a phase tracking reference signal, channel state information reference information, and a reference signal for transmitting control information.

In a possible design, the first reference signal and the second reference signal are used for different subcarrier spacings or different service types or different channel types.

According to a fifth aspect, a communications apparatus is provided, where the apparatus may be a transmit end, or may be a chip in a transmit end. The apparatus may include a processing unit and a transceiver unit. When the apparatus is a transmit end, the processing unit may be a processor, and the transceiver unit may be a transceiver. The transmit end may further include a storage unit, and the storage unit may be a memory. The storage unit is configured to store an instruction. The processing unit executes the instruction stored in the storage unit, so that the transmit end performs the method in any one of the first aspect or the possible implementations of the first aspect. When the apparatus is a chip in a transmit end, the processing unit may be a processor, and the transceiver unit may be an input/output interface, a pin, a circuit, or the like. The processing unit executes an instruction stored in a storage unit, so that the transmit end performs the method in any one of the first aspect or the possible implementations of the first aspect. The storage unit may be a storage unit (such as a register or a cache) inside the chip, or may be a storage unit (such as a read-only memory or a random-access memory) inside the transmit end and outside the chip.

According to a sixth aspect, a communications apparatus is provided, where the apparatus may be a receive end, or may be a chip in a receive end. The apparatus may include a processing unit and a transceiver unit. When the apparatus is a receive end, the processing unit may be a processor, and the transceiver unit may be a transceiver. The receive end may further include a storage unit, and the storage unit may be a memory. The storage unit is configured to store an instruction. The processing unit executes the instruction stored in the storage unit, so that the receive end performs the method in any one of the second aspect or the possible implementations of the second aspect. When the apparatus is a chip in a receive end, the processing unit may be a processor, and the transceiver unit may be an input/output interface, a pin, a circuit, or the like. The processing unit executes an instruction stored in a storage unit, so that the receive end performs the method in any one of the second aspect or the possible implementations of the second aspect. The storage unit may be a storage unit (such as a register or a cache) inside the chip, or may be a storage unit (such as a read-only memory or a random-access memory) inside the receive end and outside the chip.

According to a seventh aspect, a reference signal sending apparatus is provided, where the apparatus may be a transmit end, or may be a chip in a transmit end. The apparatus may include a processing unit and a transceiver unit. When the apparatus is a transmit end, the processing unit may be a processor, and the transceiver unit may be a transceiver. The transmit end may further include a storage unit, and the storage unit may be a memory. The storage unit is configured to store an instruction. The processing unit executes the instruction stored in the storage unit, so that the transmit end performs the method in any one of the third aspect or the possible implementations of the third aspect. When the apparatus is a chip in a transmit end, the processing unit may be a processor, and the transceiver unit may be an input/output interface, a pin, a circuit, or the like. The processing unit executes an instruction stored in a storage unit, so that the transmit end performs the method in any one of the third aspect or the possible implementations of the third aspect. The storage unit may be a storage unit (such as a register or a cache) inside the chip, or may be a storage unit (such as a read-only memory or a random-access memory) inside the transmit end and outside the chip.

According to an eighth aspect, a control information sending apparatus is provided, where the apparatus may be a transmit end, or may be a chip in a transmit end. The apparatus may include a processing unit and a transceiver unit. When the apparatus is a transmit end, the processing unit may be a processor, and the transceiver unit may be a transceiver. The transmit end may further include a storage unit, and the storage unit may be a memory. The storage unit is configured to store an instruction. The processing unit executes the instruction stored in the storage unit, so that the transmit end performs the method in any one of the fourth aspect or the possible implementations of the fourth aspect. When the apparatus is a chip in a transmit end, the processing unit may be a processor, and the transceiver unit may be an input/output interface, a pin, a circuit, or the like. The processing unit executes an instruction stored in a storage unit, so that the transmit end performs the method in any one of the fourth aspect or the possible implementations of the fourth aspect. The storage unit may be a storage unit (such as a register or a cache) inside the chip, or may be a storage unit (such as a read-only memory or a random-access memory) inside the transmit end and outside the chip.

According to a ninth aspect, a communications apparatus is provided, where the apparatus includes a memory and a processor, the memory stores an instruction, and when the instruction is run by the processor, the apparatus is enabled to perform the method in any one of the first aspect or the possible implementations of the first aspect, or any one of the second aspect or the possible implementations of the second aspect. The apparatus may be a chip system.

According to a tenth aspect, a reference signal sending apparatus is provided, where the apparatus includes a memory and a processor, the memory stores an instruction, and when the instruction is run by the processor, the apparatus is enabled to perform the method in any one of the third aspect or the possible implementations of the third aspect. The apparatus may be a chip system.

According to an eleventh aspect, a control information sending apparatus is provided, where the apparatus includes a memory and a processor, the memory stores an instruction, and when the instruction is run by the processor, the apparatus is enabled to perform the method in any one of the fourth aspect or the possible implementations of the fourth aspect. The apparatus may be a chip system.

According to a twelfth aspect, a communications system is provided, where the communications system includes the communications apparatus according to the fifth aspect and the communications apparatus according to the sixth aspect.

According to a thirteenth aspect, a computer storage medium is provided, configured to store a computer program, where the computer program includes an instruction used to perform the method in the foregoing aspects.

According to a fourteenth aspect, a computer program product that includes an instruction is provided. When the computer program product is run on a computer, the computer is enabled to perform the method in the foregoing aspects.

DESCRIPTION OF EMBODIMENTS

The following describes in detail the embodiments of this application with reference to accompanying drawings.

Figure 1:
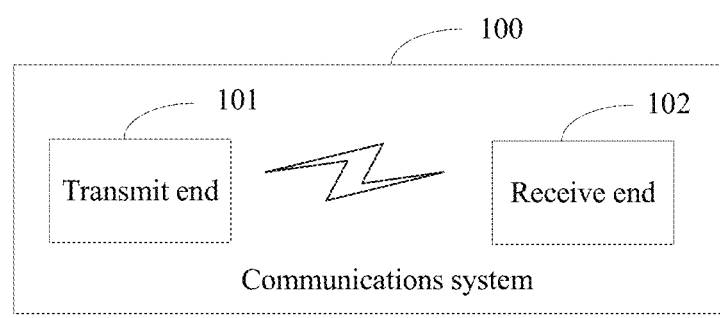
FIG. 1 is a schematic diagram of an architecture of a communications system according to an embodiment of this application.

FIG. 1 is a schematic structural diagram of a communications system 100 according to an embodiment of this application. As shown in FIG. 1, the communications system includes a transmit end 101 and a receive end 102. The transmit end 101 may be a network device, for example, a base station. The receive end 102 may be a terminal. Alternatively, the transmit end 101 may be a terminal, and the receive end 102 may be a network device. Alternatively, both the transmit end 101 and the receive end 102 are terminals. Alternatively, both the transmit end 101 and the receive end 102 are network devices.

A function of a network device is described by using an example in which the network device is a base station. The base station is an apparatus that is deployed in a radio access network and that is configured to provide a wireless communication function for a terminal. The base station may include various forms of macro base stations, micro base stations, relay nodes, access points, and the like. The base station may be applied to systems with different radio access technologies, such as a Long Term Evolution (LTE) system, or more possible communications systems such as a 5th generation (5G) communications system. The base station may be further another network device that has a function of a base station, and specially, may be further a terminal that serves as a base station in device-to-device (D2D) communication. The terminal may include various handheld devices, in-vehicle devices, wearable devices, or computing devices that have a wireless communication function, or another processing device connected to a wireless modem; and user equipments (UE), mobile stations (MS), or the like in various forms.

In this embodiment of this application, the transmit end 101 sends a message to the receive end 102.

Figure 2:
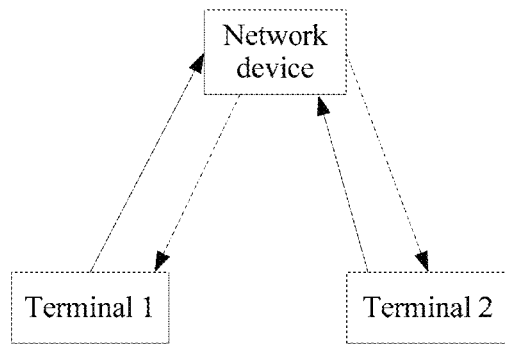
FIG. 2 is a schematic diagram of application in a cellular link according to an embodiment of this application.

The transmit end 101 may send a message to the receive end 102 through a cellular link. As shown in FIG. 2, for application on an uplink of a cellular link, a network device sends a message to a terminal 1 and a terminal 2. Alternatively, for application on a downlink of a cellular link, a terminal 1 and a terminal 2 send messages to a network device. The network device may be another type of device such as a base station or a relay node.

Figure 3:
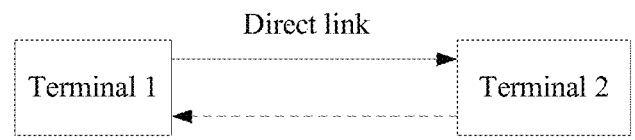
FIG. 3 is a schematic diagram of performing a transmission through a direct link according to an embodiment of this application.

The transmit end 101 may also send a message to the receive end 102 through a D2D link. As shown in FIG. 3, a terminal 1 sends a message to a terminal 2 through a direct link, or a terminal 2 sends a message to a terminal 1 through a direct link.

It should be noted that the term "and/or" in the embodiments of this application describes only an association relationship for describing associated objects and represents that three relationships may exist. For example, A and/or B may represent the following three cases: Only A exists, both A and B exist, and only B exists. The term "several" means at least two. In the embodiments of this application, ordinal numbers such as "first" and "second" are intended to distinguish between a plurality of objects, and not intended to limit a sequence of the plurality of the objects. Application scenarios described in the embodiments of this application are intended to describe the technical solutions in the embodiments of this application more clearly, but are not intended to limit the technical solutions provided in the embodiments of this application. Persons of ordinary skill in the art may learn that with evolution of network architectures and emergence of a new service scenario, the technical solutions provided in the embodiments of this application are also applicable to a similar technical problem.

Figure 4:
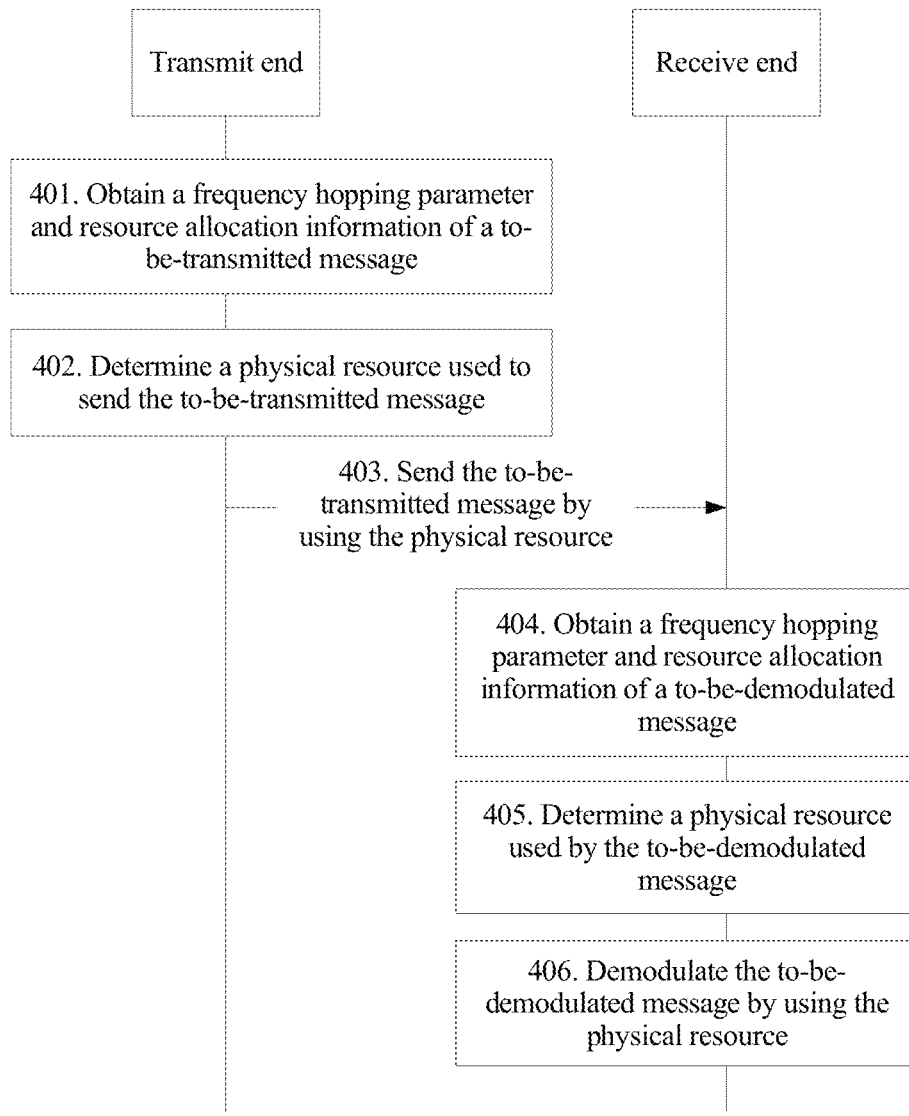
FIG. 4 is a schematic flowchart of a communication method according to an embodiment of this application.

Based on the architecture of the communications system shown in FIG. 1, as shown in FIG. 4, a specific procedure of a communication method provided in an embodiment of this application is as follows:

Step 401: A transmit end obtains a frequency hopping parameter and resource allocation information of a to-be-transmitted message.

The frequency hopping parameter includes at least one of bandwidth part indication information, beam indication information, reference signal configuration information, subcarrier spacing indication information, transmission waveform indication information, slot type indication information, channel type indication information, and transmission carrier indication information.

Step 402: The transmit end determines, based on the resource allocation information and the frequency hopping parameter, a physical resource used to send the to-be-transmitted message.

The physical resource includes information about a frequency domain resource on which the to-be-transmitted message is mapped in at least one time unit.

Step 403: The transmit end sends the to-be-transmitted message by using the physical resource, and a receive end receives the message sent by the transmit end.

Specifically, after receiving the message sent by the transmit end, the receive end needs to demodulate the message. Specific demodulation steps are the following step 404 to step 406.

Step 404: The receive end obtains a frequency hopping parameter and resource allocation information of a to-be-demodulated message.

Step 405: The receive end determines, based on the resource allocation information and the frequency hopping parameter, a physical resource used by the to-be-demodulated message, where the physical resource includes information about a frequency domain resource on which the to-be-demodulated message is mapped in at least one time unit.

Step 406: The receive end demodulates the to-be-demodulated message by using the physical resource.

It should be noted that the to-be-demodulated message demodulated by the receive end is the to-be-transmitted message sent by the transmit end. The frequency hopping parameter and the resource allocation information of the to-be-demodulated message that are obtained by the receive end are the frequency hopping parameter and the resource allocation information of the to-be-transmitted message that are obtained by the transmit end. The physical resource used by the to-be-demodulated message is the physical resource used to send the to-be-transmitted message. A manner in which the receive end determines the physical resource used by the to-be-demodulated message is the same as a manner in which the transmit end determines the physical resource used to send the to-be-transmitted message. In the following description, the manner in which the transmit end determines the physical resource used to send the to-be-transmitted message is used as an example for description. It may be understood that the receive end may determine, in the same manner, the physical resource used by the to-be-demodulated message.

In this embodiment of this application, the to-be-transmitted message includes at least one of the following: data, control information, and a reference signal.

For ease of description, in the following description, an example in which the foregoing communication method is applied to a cellular link is usually used for description. In this case, the transmit end is a terminal, the receive end is a base station, and the terminal sends a message to the base station. Alternatively, the transmit end is a base station, the receive end is a terminal, and the base station sends a message to the terminal.

For example, the transmit end is a terminal. In step 401, that a transmit end obtains a frequency hopping parameter and resource allocation information of a to-be-transmitted message may include the following cases:

Optionally, the frequency hopping parameter and the resource allocation information of the to-be-transmitted message may be obtained from information configured by a base station or a controller, or may be obtained in a predefined manner. For example, for a device-to-device link that is controlled or scheduled by a base station or a cellular link, the frequency hopping parameter and the resource allocation information of the to-be-transmitted message are usually obtained from a base station or another controller. For a system that supports out-of-coverage communication, for example, for an out-of-coverage device-to-device link, the frequency hopping parameter and the resource allocation information of the to-be-transmitted message may be obtained in a predefined manner.

Optionally, the frequency hopping parameter and the resource allocation information of the to-be-transmitted message may be obtained from a same message or may be obtained from different messages, or a part of the frequency hopping parameter and the resource allocation information of the to-be-transmitted message is obtained from a same message and the other part is obtained from another message. For example, both the resource allocation information of the to-be-transmitted message and indication information of the frequency hopping parameter are received from physical layer control information. For another example, the resource allocation information of the to-be-transmitted message is received from physical layer control information, and indication information of the frequency hopping parameter is obtained from another upper-layer message. For still another example, the resource allocation information of the to-be-transmitted message and a part of indication information of the frequency hopping parameter are received from physical layer control information, and the other part of the indication information of the frequency hopping parameter is obtained from another upper-layer message.

Optionally, the frequency hopping parameter and the resource allocation information of the to-be-transmitted message may be obtained from a same message at the same time, or may be obtained from different messages at different moments. Preferably, the frequency hopping parameter needs to be obtained before or when the resource allocation information of the to-be-transmitted message is obtained.

To facilitate understanding of the communication method provided in this embodiment of this application, the following specifically describes a definition and an indication of a bandwidth part.

In a communications system, a carrier bandwidth on a single carrier may include several bandwidth parts. There may be a plurality of definitions for a bandwidth part size: For example, the bandwidth part size may be predefined, or may be configured by using a system information block (SIB) message or a radio resource control (RRC) message.

There may be a plurality of indications for the bandwidth part size. For example, the bandwidth part size is indicated based on a physical broadcast channel (PBCH), RRC, or downlink control information (DCI). In an implementable implementation, for example, in a 5G communications system, a 400 MHz carrier bandwidth may be divided into four 100 MHz bandwidth parts, and information about the division may be predefined, or may be configured by using a SIB message or an RRC message. A bandwidth part or several bandwidth parts used by the terminal may be indicated by a base station to the terminal based on the PBCH, the RRC, or the DCI.

Optionally, bandwidth parts on an entire carrier bandwidth may be obtained through division evenly or unevenly. This is not limited in this embodiment of this application. For example, a carrier bandwidth of 80 MHz may be divided into four 20 MHz bandwidth parts. For another example, a carrier bandwidth of 80 MHz may be divided into eight 10 MHz bandwidth parts. For still another example, a carrier bandwidth of 80 MHz may be alternatively divided into two 20 MHz bandwidth parts and four 10 MHz bandwidth parts, namely, six bandwidth parts in total.

Terminals of different capability types support different bandwidths. Some terminals can support an entire carrier bandwidth. These terminals may be referred to as high-bandwidth terminals. However, some terminals can support only a part of the carrier bandwidth. These terminals may be referred to as low-bandwidth terminals. Before step 401, the base station obtains a capability type of the terminal, or the terminal sends the capability type of the terminal to the base station, where the capability type of the terminal includes a high-bandwidth terminal type or a low-bandwidth terminal type to which the terminal belongs, and/or a size of a bandwidth part that can be supported by the terminal.

Figure 5:
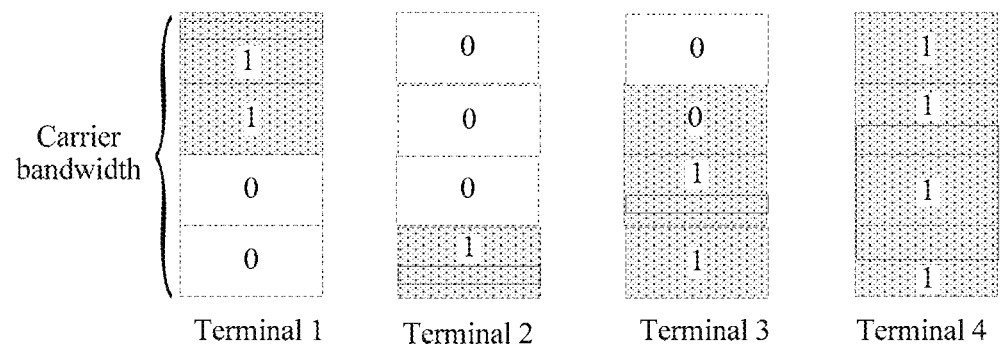
FIG. 5 is a schematic diagram of occupying a bandwidth part by a terminal according to an embodiment of this application.

The base station may indicate, based on the capability type of the terminal, a bandwidth part occupied by the terminal. Certainly, the bandwidth part occupied by the terminal is less than or equal to the size of the bandwidth part supported by the terminal. It is assumed that there are M bandwidth parts in a current carrier bandwidth, and M is a positive integer greater than or equal to 2. The base station uses a bitmap (that is, a bitmap) of M bits to indicate a bandwidth part, of the carrier bandwidth, occupied by the terminal. As shown in FIG. 5, it is assumed that a current carrier bandwidth includes four bandwidth parts. For example, the carrier bandwidth is 80 MHz, M=4, and one bandwidth part is 20 MHz. Alternatively, the carrier bandwidth is 400 MHz, M=4, and one bandwidth part is 100 MHz. Different terminals occupy different bandwidth parts of the carrier bandwidth. In FIG. 5, a bitmap manner is used to indicate a bandwidth part occupied by a terminal, and a shadow position with a mark "1" represents the bandwidth part occupied by the terminal. A terminal 1 occupies upper two consecutive bandwidth parts, a terminal 2 occupies the fourth bandwidth part, a terminal 3 occupies the second, third, and fourth bandwidth parts, and a terminal 4 occupies an entire carrier bandwidth. A bandwidth part occupied by each terminal on the current carrier bandwidth may be consecutive, or may be inconsecutive, and at least one bandwidth part is occupied.

The terminal 2 in FIG. 5 can only support one bandwidth part. A capability type of the terminal 2 determines that the terminal 2 can perform a transmission on only one bandwidth part (for example, 20 MHz in 80 MHz or 100 MHz in 400 MHz). In this case, a base station may specify one bandwidth part in an entire carrier bandwidth for the terminal 2 for transmission.

A part shown in a vertical line in FIG. 5 is a bandwidth occupied by to-be-transmitted data of a terminal. It can be learned that a bandwidth occupied by to-be-transmitted data of each of the terminal 1, the terminal 2, and the terminal 3 is less than one bandwidth part, and a bandwidth occupied by to-be-transmitted data of the terminal 4 is greater than one bandwidth part.

Specifically, the bandwidth part indication information in step 401 may include at least one of the following: a size of each bandwidth part in a carrier bandwidth, a quantity of bandwidth parts included in the carrier bandwidth, and indication information of a bandwidth part occupied by the to-be-transmitted message, used to indicate a bandwidth part in which to-be-transmitted data is located or that is available to the to-be-transmitted data. The bandwidth part indication information is predefined. Alternatively, the bandwidth part indication information is determined by using a signaling indication. In step 401, the resource allocation information includes a resource used to instruct the transmit end to perform a transmission. When the terminal can support an entire carrier bandwidth, the resource allocation information is indication information of resource allocation in the carrier bandwidth. When the terminal cannot support an entire carrier bandwidth, the resource allocation information is resource indication information in a bandwidth part. The resource allocation information may be obtained by the terminal by using predefined information, or may be indicated by the base station.

The time unit in this embodiment of this application means a unit of a time-frequency resource occupied by one transmission of the transmit end. The time unit may be classified into a slot, a mini-slot, and a slot aggregation based on a size of an occupied symbol. A size of a slot is not fixed, and a quantity of occupied symbols is not fixed either. For example, one slot may occupy seven or 14 symbols. Usually, a size of one mini-slot is not greater than a quantity of time domain resources occupied by one slot. One mini-slot may occupy a minimum of one (obtained by subtracting 1 from a slot length) symbol, and may occupy a maximum of symbols of one slot. One slot aggregation is that at least two slots are aggregated for transmission. Data transmitted in each slot during a transmission may be the same or different.

The following describes in detail a case in which the frequency hopping parameter includes the bandwidth part indication information.

When a bandwidth occupied by the to-be-transmitted message is not greater than one bandwidth part, the following Method 1 to Method 3 may be used to determine the physical resource for transmitting the to-be-transmitted message.

Method 1: In step 402, the transmit end determines a first frequency domain resource value in one bandwidth part based on the resource allocation information and the bandwidth part indication information, determines a second frequency domain resource value in the bandwidth part based on the resource allocation information and the bandwidth part indication information, and determines the physical resource based on the first frequency domain resource value and the second frequency domain resource value.

Specifically, the transmit end determines the first frequency domain resource value in the bandwidth part based on the resource allocation information in a predefined intra-bandwidth part frequency hopping manner. The predefined intra-bandwidth part frequency hopping manner may use an existing frequency hopping formula of a type 1 or a type 2 in LTE, or may use a manner of another type. Alternatively, the transmit end may determine the first frequency domain resource value in the bandwidth part based on a frequency domain location indicated in the bandwidth part.

The transmit end determines the physical resource based on the first frequency domain resource value and the second frequency domain resource value by using some operation manners.

For example, the predefined intra-bandwidth part frequency hopping manner may use the existing frequency hopping manner of the type 1 in LTE. In a possible implementation, the foregoing physical resource is determined by using the following formula (1) and formula (2).

$$n_{PRB}^{S1}(i) = N_{START}^{BP} + RB_{START} \bmod N_{BP} \qquad \text{formula (1)}.$$

Herein, $n_{PRB}^{S1}$ is a frequency domain resource information in the first time unit, namely, a frequency domain resource start value in the first time unit, $RB_{START}$ is a frequency domain resource start value indicated by the resource allocation information, namely, the foregoing first frequency domain resource value, $N_{BP}$ is a bandwidth part occupied by the to-be-transmitted message, $N_{START}^{BP}$ is a frequency domain resource start value of the bandwidth part, namely, the foregoing second frequency domain resource value, mod represents a modulo operation, and i represents an index of a time domain resource.

$$n_{PRB}(i) = N_{START}^{BP} + (\tilde{n}_{PRB}(i) + \tilde{N}_{PRB}^{HO}/2) \bmod N_{BP} \qquad \text{formula (2)}.$$

Herein, $n_{PRB}(i)$ is frequency domain resource information in the second time unit, namely, a frequency domain resource start value in the second time unit, and the second time unit is adjacent to the first time unit. $N_{START}^{BP}$ is the frequency domain resource start value of the bandwidth part, namely, the foregoing second frequency domain resource value. $\tilde{n}_{PRB}(i)$ is a frequency domain location determined by the terminal in the second time unit in the existing frequency hopping manner of the type 1 in LTE, $\tilde{N}_{PRB}^{HO}$ is a frequency domain offset value, mod represents the modulo operation, and i represents the index of the time domain resource.

For another example, the predefined intra-bandwidth part frequency hopping manner may use the existing frequency hopping manner of the type 2 in LTE. In a possible implementation, the foregoing physical resource is determined by using the following formula (3).

$$\tilde{n}_{PRB}(n_s) = N_{START}^{BP} + (\tilde{n}_{VRB} + f_{hop}(i) \cdot N_{RB,BP}^{sb} + ((N_{RB}^{sb} - 1) - 2(\tilde{n}_{VRB} \bmod N_{RB}^{sb})) \cdot f_m(i)) \bmod (N_{RB,BP}^{sb} \cdot N_{sb,BP}) \qquad \text{formula (3)}.$$

Herein, $\tilde{n}_{PRB}(n_s)$ represents the foregoing physical resource, $n_s$ is a slot index, and $N_{START}^{BP}$ is a frequency domain resource start value of the bandwidth part, namely, the foregoing second frequency domain resource value. $\tilde{n}_{VRB}$ is a frequency domain resource start value indicated by the resource allocation information, $f_{hop}(i)$ is a frequency hopping function, and i is a index of a time domain resource. In this embodiment of this application, when an inter-slot frequency hop is performed, $i = n_s$, and when an intra-slot frequency hop is performed, $i = \lfloor l/K \rfloor$, where l is a symbol index in a slot, and K is a quantity of intra-slot frequency hops. For example, when one slot has 14 symbols and an intra-slot frequency hop is performed every seven symbols, $K=2$. When a frequency hop of a slot aggregation or a frequency hop of reference signal bounding is performed, $i = \lfloor n_s/K \rfloor$, where K is a quantity of bound reference signals or a quantity of aggregated slots. $N_{RB,BP}^{sb}$ is a sub-band parameter in the bandwidth part, $N_{sb,BP}$ is a size of a sub-band, and $f_m(i)$ is a frequency hopping mirror image function.

In addition, the transmit end may further determine an initial value of a random sequence based on the first frequency domain resource value and the second frequency domain resource value. The random sequence herein may be referred to as a first random sequence, and the transmit end generates the first random sequence, and determines the physical resource based on the first random sequence.

Method 2: In step 402, the transmit end determines the physical resource based on the resource allocation information, the bandwidth part indication information, and a frequency domain offset value. The following formula (4-0) is shown:

$$PRB(n_s) = (PRB_{BP}(n_s) + N_0 + (n_s \bmod M) \cdot N_{BP}) \bmod N_{TBP} \quad \text{formula (4-0)}.$$

Herein, $N_0$ is the frequency domain offset value.

Method 3: In step 402, the transmit end determines the physical resource based on the resource allocation information and a bandwidth part quantity and/or a bandwidth part index.

The bandwidth part indication information includes the bandwidth part quantity and/or the bandwidth part index. The bandwidth part quantity includes any one of the following: a quantity of bandwidth parts included in a carrier bandwidth of the transmit end, a quantity of bandwidth parts that can be supported by the transmit end, and a quantity of bandwidth parts allocated to the transmit end.

Specifically, the transmit end determines the physical resource based on the resource allocation information, an index of a time domain resource and/or a frequency domain resource used to send the to-be-transmitted message, and the bandwidth part quantity and/or the bandwidth part index.

In a possible implementation, the transmit end determines the foregoing physical resource by using a formula (4), a formula (5), a formula (6), or a formula (7).

$$PRB(n_s)=(PRB_{BP}(n_s)+(n_s \bmod M) \cdot N_{BP}) \bmod N_{TBP} \quad \text{formula (4)}$$

Herein, $PRB(n_s)$ represents the foregoing physical resource, $n_s$ is a slot index, $PRB_{BP}(n_s)$ represents a specified intra-bandwidth part frequency hopping manner, $N_{TBP}$ represents a quantity of bandwidth parts supported by the terminal, $N_{BP}$ represents a size of the bandwidth part, and M represents the bandwidth part quantity and/or the bandwidth part index.

$$PRB(n_s)=(PRB_{BP}(n_s)+(an_s+b \bmod M) \cdot N_{BP}) \bmod N_{TBP} \quad \text{formula (5)}$$

Herein, a and b are constants, and other parameters are the same as those in the formula (4). No repeated description is provided.

$$PRB(n_s)=(PRB_{BP}(n_s)+((a \cdot n_s^2+b \cdot n_s+c) \bmod M) \cdot N_{BP}) \bmod N_{TBP} \quad \text{formula (6)}$$

Herein, a, b, and c are constants, and other parameters are the same as those in the formula (4). No repeated description is provided.

Optionally, the transmit end determines an initial value of a second random sequence based on the resource allocation information, the index of the time domain resource and/or the frequency domain resource used to send the to-be-transmitted message, and the bandwidth part quantity, generates the second random sequence, and determines the physical resource based on the second random sequence. Specifically, a random function is used based on the foregoing formula (4) to formula (6).

$$PRB(n_s)=(PRB_{BP}(n_s)+((a \cdot n_s^2+b \cdot n_s+c+df(i)) \bmod M) \cdot N_{BP}) \bmod N_{TBP} \quad \text{formula (7)}$$

Herein, f(i) is generated based on a random sequence function, for example, f(i)=g*c(10i), c( ) is a function for generating a random sequence, g is a non-zero constant, and other parameters are the same as those described in the formula (4). No repeated description is provided.

Figure 6:
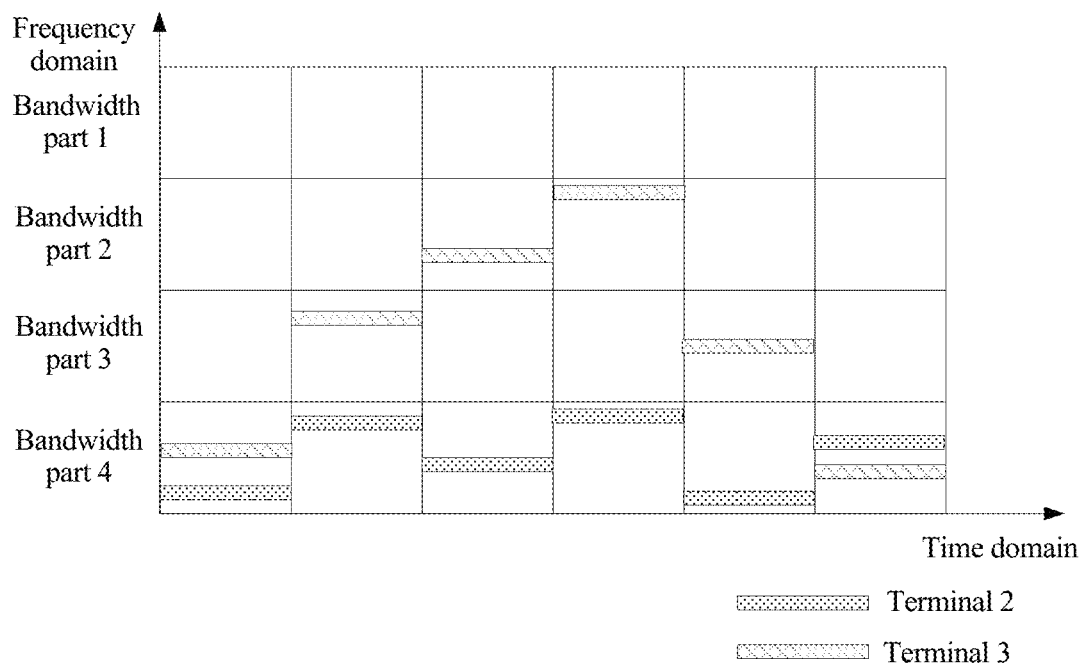
FIG. 6 is a schematic diagram of determining a physical resource by a terminal 2 and a terminal 3 according to an embodiment of this application.

The terminal 2 and the terminal 3 shown in FIG. 5 are used as examples. FIG. 6 is a schematic diagram of determining a physical resource by the terminal 2 and the terminal 3 by using any one of the foregoing Method 1 to Method 3. The terminal 2 shown in FIG. 5 occupies one bandwidth part, and the terminal 3 occupies three bandwidth parts. As shown in FIG. 6, shadow parts are bandwidths occupied by to-be-transmitted data of the terminal 2 and the terminal 3. It can be learned that the bandwidths occupied by the terminal 2 and the terminal 3 for transmitting the data are less than a size of one bandwidth part. The terminal 2 always transmits a message in the fourth bandwidth part (that is, a bandwidth part 4) in different time units. Bandwidth parts occupied by the terminal 3 in different time units may be the same or different. Because the terminal 2 and the terminal 3 use a same intra-bandwidth part frequency hopping manner, when resource allocation information of the terminal 2 and resource allocation information of the terminal 3 are different or do not overlap, determined physical resources are different or do not overlap either. In this way, a resource conflict after frequency hopping can be reduced, and a fragment generated during resource allocation can be reduced. In addition, a narrow-bandwidth capability terminal and a wide-bandwidth capability terminal can better coexist, thereby reducing a frequency hopping conflict and a resource fragment. In this way, a to-be-transmitted message can be further transmitted between several bandwidth parts based on an intra-bandwidth part frequency hopping manner by using the foregoing Method 1 to Method 3, to obtain a better frequency diversity gain.

When a bandwidth occupied by the to-be-transmitted message is greater than one bandwidth part, the following Method 4 may be used to determine the physical resource for transmitting the to-be-transmitted message.

Method 4: In step 402, the transmit end obtains a third frequency domain resource value, in one bandwidth part, included in the resource allocation information, and when the bandwidth occupied by the to-be-transmitted message is greater than one bandwidth part, the transmit end determines, based on the third frequency domain resource value from all bandwidth parts configured for the transmit end, the physical resource for transmitting the to-be-transmitted message.

In a possible implementation, the transmit end determines the foregoing physical resource by using a formula (8), a formula (9), or a formula (10).

All the bandwidth parts configured for the transmit end are greater than the bandwidth occupied by the to-be-transmitted message. Optionally, an entire carrier bandwidth is allocated to the transmit end.

$$PRB(n_s)=(PRB_{START,BP}(n_s)+((a \cdot n_s^2+b \cdot n_s+c) \bmod M) \cdot N_{BP}) \bmod N_{TBP} \quad \text{formula (8)}$$

Herein, $PRB_{START,BP}(n_s)$ is a frequency domain start value in one bandwidth part, namely, the third frequency domain resource value. For the description of other parameters, refer to the formula (4). Details are not described herein again.

In the method represented by the formula (8), the transmit end performs frequency hopping only between bandwidth parts, and the frequency domain start value in the bandwidth part remains unchanged after the frequency hopping.

$$PRB(n_s)=(PRB_{START,BP}(n_s)+((a \cdot n_s^2+b \cdot n_s+c) \bmod M) \cdot N_{BP}) \bmod N_{TBP} \quad \text{formula (9)}$$

Herein, $PRB_{START,BP}(n_s)$ is the frequency domain start value in the bandwidth part, and $N_O$ represents a frequency domain offset value. For the description of other parameters, refer to the formula (4). Details are not described herein again.

In the method represented by the formula (9), the transmit end performs frequency hopping based on the third frequency domain resource value included in the resource allocation information, the bandwidth part indication information, and the frequency domain offset value.

$$PRB(n_s)=(N_O+PRB_{START,BP}(n_s)+((a \cdot n_s^2+b \cdot n_s+c) \bmod M) \cdot N) \bmod N_{TBP} \quad \text{formula (10)}$$

For the description of each parameter, refer to the formula (9). Details are not described herein again.

A method represented by the formula (10) may be considered as a combination of the two methods of the formula (8) and the formula (9).

Optionally, a random function is used based on the foregoing formula (8) to formula (10). A specific method is similar to the method of the formula (7). Same details are not described again.

Figure 7:
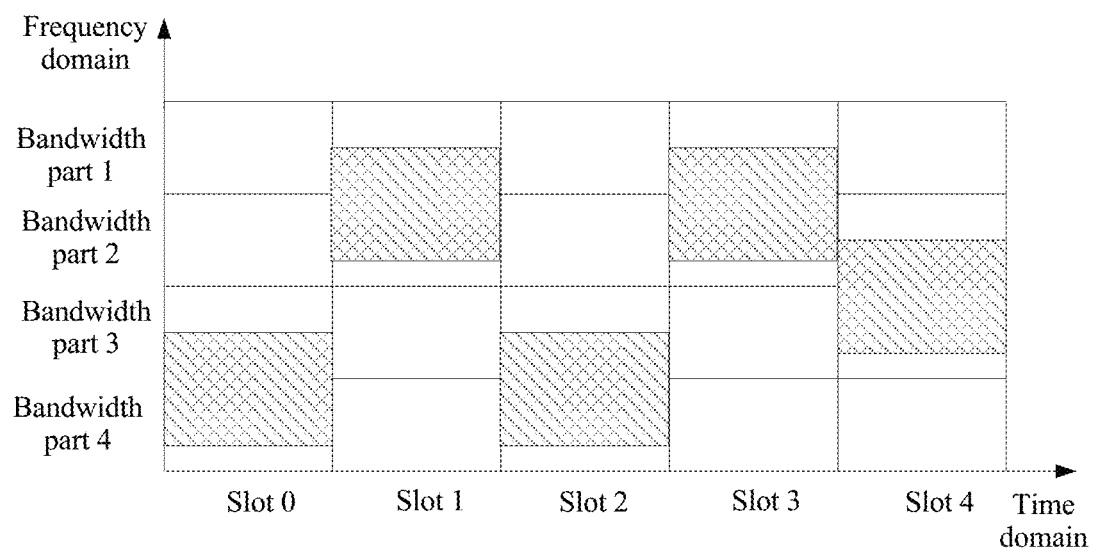
FIG. 7 is a schematic diagram of determining a physical resource by a terminal 4 according to an embodiment of this application.

The terminal 4 shown in FIG. 5 is used as an example. FIG. 7 is a schematic diagram of determining a physical resource by the terminal 4 by using the foregoing Method 4. The terminal 4 shown in FIG. 5 occupies an entire carrier bandwidth. As shown in FIG. 7, a shadow part is a bandwidth occupied by to-be-transmitted data of the terminal 4, the bandwidth occupied by the terminal 4 for transmitting the data is greater than a size of one bandwidth part, and bandwidth parts occupied by the terminal 4 in different time units may be the same or different. The terminal 4 determines the third frequency domain resource value in the bandwidth part in each time unit according to any one of the foregoing formula (8) to formula (10) or with reference to a random function. In this way, when a bandwidth for one transmission of the transmit end is relatively wide, the transmit end only performs overall frequency hopping of a frequency shift in a bandwidth part seen by the transmit end. This can reduce complexity of frequency hopping, and facilitate control of a resource location of the transmit end after the frequency hopping. When the transmit end is a terminal, a frequency hopping effect can be achieved, and prediction performed by the base station on a resource location of the terminal after frequency hopping can also be facilitated.

The foregoing describes in detail the case in which the frequency hopping parameter includes the bandwidth part indication information. The following describes in detail a case in which the frequency hopping parameter includes at least one of the beam indication information, the reference signal configuration information, the subcarrier spacing indication information, the transmission waveform indication information, the slot type indication information, the channel type indication information, and the transmission carrier indication information. In a method described below, the frequency hopping parameter may include the bandwidth part indication information, or may not include the bandwidth part indication information.

To facilitate understanding of this embodiment of this application, the foregoing frequency hopping parameters are first described.

The beam indication information is used to indicate a beam on which a transmission is performed, and the beam may be indicated by using a beam identifier, a time-frequency resource used by the beam, or the reference signal configuration information.

The subcarrier spacing indication information is used to indicate a subcarrier spacing used during a transmission. For example, a value of the subcarrier spacing may be 15 KHz, 30 KHz, 60 KHz, 120 KHz, 240 KHz, or 480 KHz. Further, different subcarrier spacings may be used for different service types. For example, an enhanced mobile broadband (enhanced Mobile Broadband, eMBB) service may use a subcarrier spacing of 15 KHz, and an ultra-reliable and low latency communications (Ultra Reliable & Low Latency Communication, URLLC) service may use subcarrier spacings of 60 KHz and 30 KHz. Therefore, the subcarrier spacing indication information can be used not only for different communication frequency bands, but also for different service types. One piece of indication information may be used to indicate a specifically used carrier spacing, for example, n=0, 1, 2, . . . , 5 are respectively used to indicate subcarrier spacings of 15 KHz to 480 KHz.

The transmission waveform indication information is used to indicate a waveform used during a transmission. Optional waveforms include at least two types of an orthogonal frequency division multiplexing (Orthogonal Frequency Division Multiplexing, OFDM) waveform, a discrete fourier transform spread orthogonal frequency division multiplexing (Discrete Fourier Transform-Spread OFDM, DFT-S-OFDM) waveform, or a time domain waveform. One piece of indication information may be used to indicate a specifically used carrier spacing. For example, 1 may be used to indicate OFDM, and 0 is used to indicate DFT-S-OFDM.

The slot type indication information includes a slot, a mini-slot, and an aggregation slot. A slot usually occupies seven or 14 symbols, and a quantity of symbols occupied by a mini-slot is smaller than a quantity of symbols occupied by a slot. Usually, there may be a plurality of mini-slots in one slot. The aggregation slot may also be referred to as a slot aggregation, and the aggregation slot usually includes a plurality of slots that are consecutive or inconsecutive in time domain. One piece of indication information may be used to indicate a specifically used slot type. For example, 0 may be used to indicate a mini-slot, 1 is used to indicate a slot, and 2 is used to indicate an aggregation slot.

The channel type indication information includes a format indicated as a control channel or a data channel, or includes formats indicated as different control channels, for example, a short control channel and a long control channel, or a control channel occupying one time domain symbol, a control channel occupying two time domain symbols, and a control channel occupying at least four symbols. One piece of indication information may be used to indicate a specifically used channel format. For example, 0 may be used to represent a 1-symbol control channel, 1 represents a 2-symbol control channel, and 2 represents a long control channel.

The transmission carrier indication information is used to indicate a type of a current carrier, or a frequency range (a high frequency or a low frequency) of a current carrier, or a configuration parameter related to a current carrier frequency, for example, one or more types of information such as a subcarrier spacing, a sub-band size, a configuration of a bandwidth part, and a maximum quantity of carriers that can be supported. One piece of indication information may be used to indicate specifically used carrier frequency. For example, 0 may be used to indicate a low frequency below 6 GHz, and 1 is used to indicate a high frequency above 6 GHz.

The reference signal configuration information is used to indicate whether reference signals on a plurality of time domain resources for sending the message are bound in time domain, and/or to indicate one or more types of generation parameters for the reference signals, where the generation parameters for the reference signals include: an initial value of a generation sequence, a root sequence number of the generation sequence, a cyclic shift value of the generation sequence, an orthogonal sequence index of the generation sequence, and the like.

Transmission parameters and service features corresponding to the foregoing frequency hopping parameters are greatly different from each other. The physical resource used to send the to-be-transmitted message is determined by using one or more types of the foregoing frequency hopping parameter, and different frequency hopping manners may be given for different transmission parameters and services, to obtain optimal transmission performance.

Method 5: In step 402, the transmit end determines the physical resource based on the resource allocation information, the frequency hopping parameter, and a configured frequency domain offset value.

For example, the frequency hopping parameter is the beam indication information. It is assumed that the beam indication information is a beam identifier, and the transmit end determines a physical resource during a transmission based on the beam identifier and the frequency domain offset value. In a possible implementation, the foregoing physical resource is determined by using a formula (11).

$$n_{PRB}(i)=\tilde{n}_{PRB}(i)+\tilde{N}_{RB}^{HO}/2+B_{ID}*\Delta \quad \text{formula (11).}$$

Herein, $B_{ID}$ represents the beam identifier, and $\Delta$ represents the frequency domain offset value. For other parameters, refer to the description in the formula (2). Details are not described herein again.

Method 6: In step 402, the transmit end determines an initial value of a third random sequence based on the resource allocation information and the frequency hopping parameter, generates the third random sequence, and determines the physical resource based on the third random sequence.

For example, the frequency hopping parameter is the beam indication information. It is assumed that the beam indication information is a beam identifier, and the initial value of the third random sequence is generated based on the beam identifier. In a possible implementation, the initial value of the third random sequence is generated by using a formula (12), to further determine the physical resource.

$$c_{init}=2^{N+M}\cdot(n_f \bmod K)+2^M\cdot N_{ID}^{cell}+B_{ID} \quad \text{formula (12)}$$

Herein, $c_{init}$ is the initial value of the third random sequence, $N_{ID}^{cell}$ represents a cell identifier, K is a positive integer, $n_f$ represents a system frame number, M and N are positive integers, M is a possible quantity of bits occupied by the beam identifier, and N is a quantity of bits occupied by the cell identifier. For example, if a value range of $N_{ID}^{cell}$ is 0-503, N is 9; or if a value range of $N_{ID}^{cell}$ is 0-999, N is 10. For another example, if a value range of the beam identifier $B_{ID}$ is 0-7, a value of M is 3.

When performing frequency hopping between bandwidth parts, the transmit end determines the foregoing physical resource by using any one of the foregoing frequency hopping parameters in combination with the bandwidth part indication information. In a possible implementation, the foregoing physical resource is determined by using a formula (13).

For example, the frequency hopping parameter is the beam indication information. It is assumed that the beam indication information is a beam identifier, and it is determined that the beam identifier is used when frequency hopping is performed in different bandwidth parts.

$$PRB(n_s)=(PRB_{START,BP}(n_s)+N_O+a\cdot B_{ID}) \bmod N_{TBP} \quad \text{formula (13)}$$

For a meaning of each parameter, refer to the formula (9) and the formula (12). Details are not described herein again.

In different beam solutions, there are different frequency hopping manners for different frequency hopping parameters. This reduces interference between different beams, and achieves optimal transmission performance.

In the foregoing formula (11) to formula (13), the example in which the frequency hopping parameter is the beam indication information is used for description. When the frequency hopping parameter is another parameter described above, the frequency hopping parameter may be used to replace the beam identifier in the foregoing formula to determine the physical resource in a same manner.

Further, a combination of at least two types of parameters may be used to determine the physical resource.

For example, in the formula (11), a physical resource may be determined by using both a slot type and a beam identifier. For details, refer to a formula (14).

$$n_{PRB}(i)=\tilde{n}_{PRB}(i)+\tilde{N}_{RB}^{HO}/2+B_{ID}*\Delta_1+T_{slot}*\Delta_2 \quad \text{formula (14)}$$

Toot represents a slot type, $\Delta_1$ represents a frequency domain offset value of the beam identifier, and $\Delta_2$ represents a frequency domain offset value of the slot type. For meanings of other parameters, refer to the description of the formula (11). Details are not described herein again.

For another example, in the formula (12), the initial value of the third random sequence may be generated by using both a slot type and a beam identifier, to further determine the physical resource. For details, refer to a formula (15).

$$c_{init}=2^{N+M}\cdot(n_f \bmod K)+2^M\cdot N_{ID}^{cell}+B_{ID}+T_{slot} \quad \text{formula (15)}$$

For a meaning of each parameter, refer to the formula (12) and the formula (14). Details are not described herein again.

For still another example, in the formula (13), the physical resource may be determined by using both a slot type and a beam identifier. For details, refer to a formula (16).

$$PRB(n_s)=(PRB_{START,BP}(n_s)+N_O+a\cdot B_{ID}+b\cdot T_{slot}) \bmod N_{TBP} \quad \text{formula (16)}$$

Herein, a and b are constants. For meanings of other parameters, refer to the formula (13). Details are not described herein again.

In conclusion, the manners of determining the physical resource in the foregoing Method 1 to Method 6 may be designed for different content included in the frequency hopping parameter.

When the foregoing frequency hopping parameters used by a transmit end during a transmission include only one type of frequency hopping parameter different from those used by another transmit end, according to the foregoing embodiment, a transmit end 1 and a transmit end 2 may have different physical resources for an actual transmission in the foregoing frequency hopping manners during the transmission, so that continuous resource conflicts or collisions between the two UEs during the transmission can be avoided.

Optionally, in step 402, the transmit end further obtains a frequency hopping type, and the frequency hopping type is used to indicate a manner of determining a physical resource used by the transmit end to obtain the to-be-transmitted message. For example, the frequency hopping type includes any one frequency hopping type in the foregoing Method 1 to Method 6.

Optionally, the transmit end obtains the frequency hopping type by using at least one of the following indication information: indication information of a bandwidth part allocated to the transmit end and indication information of resource allocation in a bandwidth part.

Specifically, for example, the frequency hopping type is explicitly or implicitly indicated by using the indication information of the bandwidth part. When the indication of bandwidth part is used to indicate a bandwidth part in which the transmit end performs a transmission, the information is further used to explicitly or implicitly indicate a hopping manner or a frequency hopping parameter.

For another example, the frequency hopping type (which may include a hopping manner or a frequency hopping parameter) is explicitly or implicitly indicated by using the indication information of resource allocation in the bandwidth part.

For still another example, the frequency hopping type (which may include a hopping manner or a frequency hopping parameter) is explicitly or implicitly indicated by using the indication information of the bandwidth part and the indication information of resource allocation in the bandwidth part.

Optionally, the frequency hopping type may be indicated by using both the indication information of the bandwidth part and other indication information indicating a frequency hopping manner. For example, 1 bit is used to indicate whether the terminal performs intra-bandwidth part frequency hopping or performs inter-bandwidth part frequency hopping. For example, in Table 1, 1 bit is used to indicate whether the terminal performs frequency hopping in a bandwidth part. For example, 1 indicates yes, and 0 indicates that the terminal performs inter-bandwidth part frequency hopping. When a value of the bit is 0, the bandwidth part indication information is no longer used to indicate a bandwidth part, but is used to indicate different manners of performing frequency hopping in a carrier bandwidth or a system bandwidth. When a value of the bit is 1, it indicates that frequency hopping may be performed in a bandwidth part, and then a bandwidth part in which a transmission and frequency hopping are performed is determined based on indication information of the bandwidth part, and indication information in the bandwidth part is used to indicate a frequency hopping manner. A bandwidth part is represented by using a Part 1, a Part 2, a Part 3, and a Part 4, . . . . A frequency hopping pattern is represented by using a Pattern 1, a Pattern 2, a Pattern 3, a Pattern 4, . . . .

Optionally, three types of indication information are used to simultaneously indicate a frequency hopping manner and include frequency hopping indication information related to a bandwidth part, the bandwidth part, and resource allocation indication information in the bandwidth part.

$$PRB(n_s) = \begin{cases} PRB_{BP}(n_s) \\ (PRB_{BP}(n_s) + (n_s \bmod M) \cdot N_{BP}) \bmod N_{TBP} \end{cases},$$

where $PRB(n_s) = PRB_{BP}(n_s)$, it indicates that the transmit end performs intra-bandwidth part frequency hopping, in other words, the physical resource used by the to-be-transmitted message is determined in a bandwidth part. When $PRB(n_s) = (PRB_{BP}(n_s) + (n_s \bmod M) \cdot N) \bmod N_{TBP}$, it indicates that the transmit end performs inter-bandwidth part frequency hopping, in other words, the physical resource used by the to-be-transmitted message is determined between bandwidth parts.

In this way, different frequency hopping manners are used for intra-bandwidth part frequency hopping and inter-bandwidth part frequency hopping, and a corresponding frequency hopping solution may be provided for terminals of different bandwidth capability types, so that a system can support the terminals of the different bandwidth capability types in simultaneously performing frequency hopping, thereby improving system flexibility and communication efficiency.

Optionally, different values of the frequency hopping parameter are associated with different configuration parameters for determining the physical resource used by the to-be-transmitted message.

Specifically, when a same frequency hopping parameter and a same frequency hopping formula are used to determine the physical resource, for different values of the frequency hopping parameter, different values need to be selected for the configuration parameters for determining the physical resource, where the configuration parameters include one or more types of a bandwidth part, a frequency domain offset value, a frequency domain start location, and the like.

Optionally, different values of the frequency hopping parameter are associated with different frequency hopping

TABLE 1

| | Indicating whether frequency hopping is intra-bandwidth part frequency hopping or not | Bandwidth part indication information | Bandwidth part for frequency hopping | Indication information in the bandwidth part | Frequency hopping pattern |
|---|---|---|---|---|---|
| Intra-bandwidth frequency hopping | 1 | 00 | Part 1 | 00 | Pattern 1 |
| | 1 | 01 | Part 2 | 01 | Pattern 2 |
| | 1 | 10 | Part 3 | 10 | Pattern 3 |
| | 1 | 11 | Part 4 | 11 | Pattern 4 |
| Full-bandwidth frequency hopping | 0 | 00 | System bandwidth | — | Pattern 1' |
| | 0 | 01 | | — | Pattern 2' |
| | 0 | 10 | | — | Pattern 3' |
| | 0 | 11 | | — | Pattern 4' |

Optionally, before step 402, the transmit end further obtains indication information, where the indication information is used to instruct the transmit end to determine, in a bandwidth part, the physical resource used by the to-be-transmitted message, or the indication information is used to instruct the transmit end to determine, between bandwidth parts, the physical resource used by the to-be-transmitted message. For example, different signaling or different values indicated by same signaling are used to indicate whether the transmit end performs inter-bandwidth part frequency hopping. The formula (4) is used as an example. When a manner of determining the physical resource used by the to-be-transmitted message is represented as types, and the frequency hopping type is used to indicate a manner of determining a physical resource used by the transmit end to obtain the to-be-transmitted message. In a possible implementation, different values of carrier types correspond to different frequency hopping types. For example, a frequency hopping type 1 is used for a high frequency carrier, and a frequency hopping type 2 is used for a low frequency carrier.

In this way, different configuration parameters or frequency hopping types are configured for different values of the frequency hopping parameter, to implement a pertinent optimized frequency hopping solution for the different values of the frequency hopping parameter, thereby achieving an optimal transmission effect.

As described above, in this embodiment of this application, a time unit may be a slot, a mini-slot, or a slot aggregation. It may be considered that one time unit includes at least one slot, or one time unit includes at least one symbol in one slot.

If the time unit includes at least one symbol in one slot, that the transmit end determines the physical resource is actually as follows: The transmit end determines a frequency domain resource location at which the to-be-transmitted message is mapped in different symbols in one slot.

One slot includes a first part and a second part in time domain, the first part includes first reference signals and a first data symbol, the second part includes a second data symbol, and the different symbols in the slot include the first data symbol and the second data symbol. Optionally, the first data symbol is located at a fourth frequency domain resource location, and the second data symbol is located at a fifth frequency domain resource location; and the first reference signals are separately located at the fourth frequency domain resource location and the fifth frequency domain resource location in frequency domain.

Figure 8:
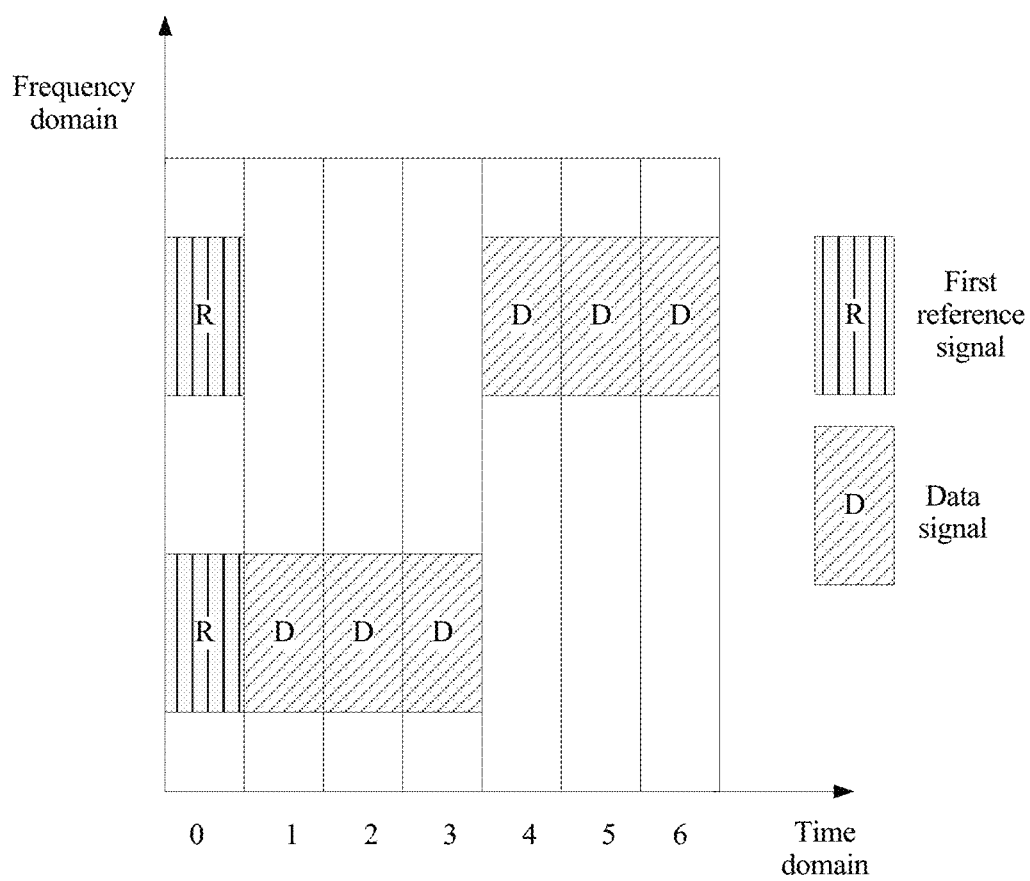
FIG. 8 is a schematic structural diagram 1 of a slot according to an embodiment of this application.

For example, as shown in FIG. 8, data signals are divided into two parts in frequency domain that respectively occupy the fourth frequency domain resource location and the fifth frequency domain resource location, and different parts are sent in the first data symbol and the second data symbol in the slot. To support demodulation of a latter part of data, a first reference signal needs to be sent at each of the two frequency domain locations at which the data appears. A slot shown in FIG. 8 is of seven symbols, and to-be-transmitted data signals may be separately placed at different frequency domain resource locations in the first four symbols and the last three symbols. Then, same first reference signals are placed on corresponding bandwidths corresponding to these two parts of frequency domain resource locations, and transmit power on the first reference signals is correspondingly scaled in ratios of the two bandwidths. For example, when lengths of two parts of frequency domain data are equal, power of two parts of the first reference signals each occupies half of power in a symbol at that time.

3GPP agrees that a symbol of an additional DMRS can be configured at a necessary location in one slot. Based on this, optionally, the second part further includes a second reference signal. The second reference signal is located at a time domain start location of the second part.

Figure 9:
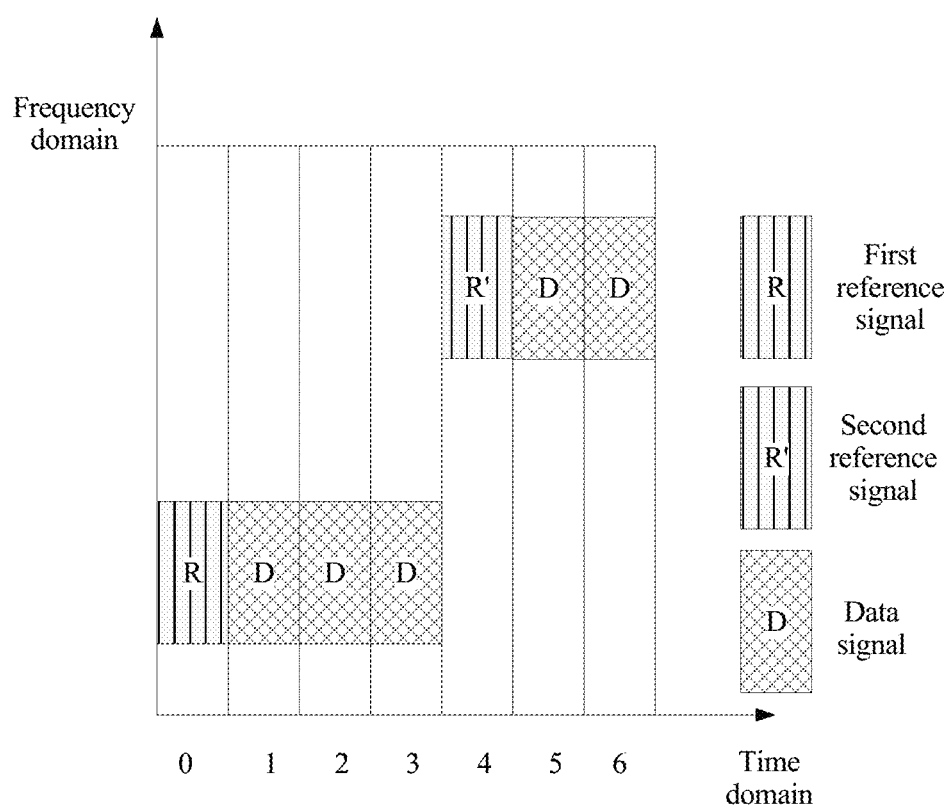
FIG. 9 is a schematic diagram of an intra-slot frequency hop that is based on an additional configuration reference signal according to an embodiment of this application.

As shown in FIG. 9, R' represents an additionally configured DMRS, that is, the second reference signal. When an additional DMRS is configured for the terminal in one slot, the terminal supports intra-slot frequency hopping. A location of frequency hopping starts from a location of the additional DMRS.

To be specific, a time domain location of a physical resource on which intra-slot hopping is performed is determined based on a symbol location at which the intra-slot hopping occurs.

A manner of determining the physical resource for the intra-slot hopping may be obtained by partially adjusting the foregoing Method 1 to Method 6. Specifically, a value of the index i of the time domain resource needs to be revised, for example, $i=\lfloor l/K \rfloor$ or $i=2n_s+l \mod K$. K=4 or 7, l is an index of a symbol location in a slot, and K is the symbol location at which the intra-slot hopping occurs.

Figure 10:
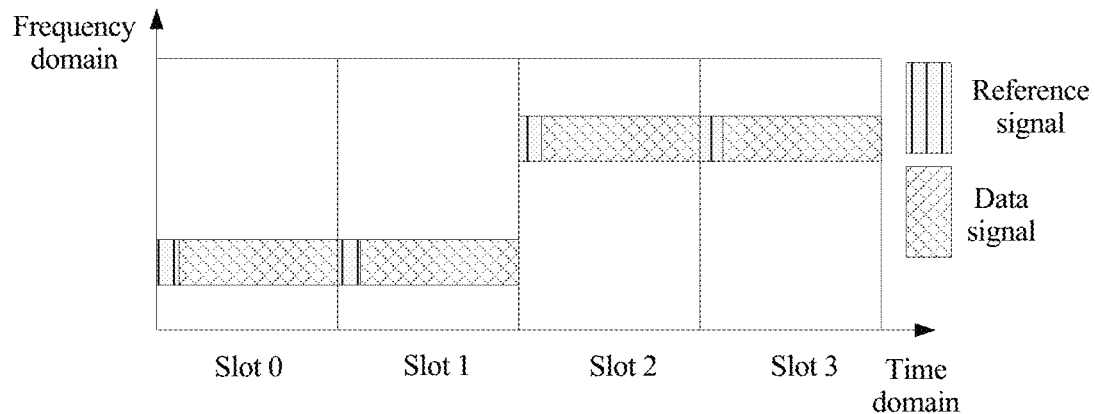
FIG. 10 is a schematic structural diagram 2 of a slot according to an embodiment of this application.

Optionally, when reference signals can be bound in time domain for transmission, as shown in FIG. 10, a same frequency hopping type is used in several slots in which reference signals are bound. In this case, the foregoing time unit includes at least two slots. In step 403, the transmit end sends the to-be-transmitted message in a manner of binding reference signals in the at least two slots and by using a same frequency domain resource.

If the index of the time domain resource used to send the to-be-transmitted message is used by the transmit end to determine the physical resource, the index of the time domain resource used to send the to-be-transmitted message is determined by using indexes of slots in which the reference signals are bound and a quantity of slots in which the reference signals are bound. For example, the value of the index i of the time domain resource used to send the to-be-transmitted message is $i=\lfloor n_s/K \rfloor$, where K is a configured quantity of slots in which the reference signals are bound.

The foregoing method in this embodiment of this application may be used for dynamic scheduling, or may be used for semi-persistent scheduling, or may be used for a plurality of retransmissions of one piece of data or for a transmission in a slot aggregation. The solutions of the present invention may be used for frequency hopping between different slots and intra-slot frequency hopping. When intra-slot frequency hopping is performed, a frequency diversity gain of one data packet in a single transmission may be obtained. When inter-slot frequency hopping is performed, a same data packet (for example, a plurality of retransmissions of a same data packet) or data packets of same UE at different moments (such as a plurality of data packets in a semi-persistent transmission of one UE) may be transmitted at different frequencies, to obtain a frequency diversity gain. When a transmission is performed in a slot aggregation manner, a frequency hopping solution of the present invention may be used in a plurality of aggregation slots, and a frequency hopping solution of the present invention may also be used between a plurality of aggregation slots, to provide a frequency diversity gain for a transmission of the aggregation slots.

Figure 11:
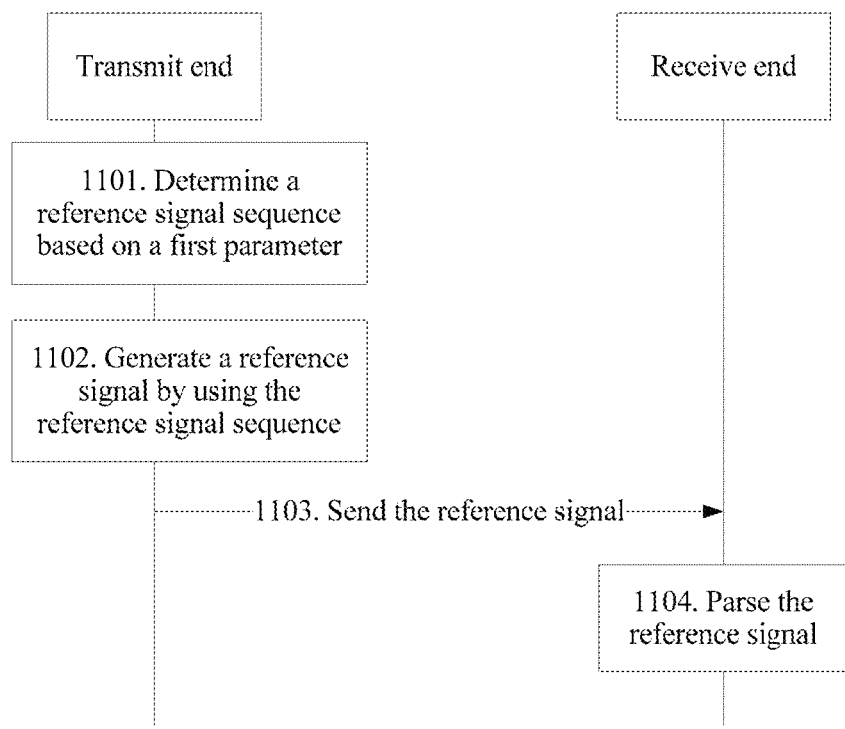
FIG. 11 is a schematic flowchart of a reference signal sending method according to an embodiment of this application.

Based on the architecture of the communications system shown in FIG. 1, as shown in FIG. 11, an embodiment of this application further provides a reference signal sending method, and a specific procedure is as follows:

Step 1101: A transmit end determines a reference signal sequence based on a first parameter, where the first parameter includes at least one of the following: bandwidth part indication information, beam indication information, reference signal configuration information, subcarrier spacing indication information, transmission waveform indication information, slot type indication information, channel type indication information, and transmission carrier indication information.

Step 1102: The transmit end generates a reference signal by using the reference signal sequence.

Step 1103: The transmit end sends the reference signal, and a receive end receives the reference signal.

Step 1104: The receive end parses the reference signal.

A method used by the receive end to parse the reference signal corresponds to a method used by the transmit end to send the reference signal. No repeated description is provided.

Optionally, the reference signal includes at least one of the following: a demodulation reference signal, a reference signal for transmitting control information, a sounding reference signal, a positioning reference signal, channel state information reference information, and a phase tracking reference signal.

Optionally, the transmit end determines a second parameter based on the first parameter, where the second parameter includes at least one of the following: a cyclic shift value, an orthogonal sequence index, a root sequence index, and an initial value; and determines the reference signal sequence based on the second parameter.

If the second parameter includes the cyclic shift value, correspondingly, the transmit end determines the cyclic shift value based on the first parameter and a third parameter, where the third parameter includes at least one of the following: an indication value of the cyclic shift value, resource indication information for sending the reference signal, an orthogonal sequence index for generating the reference signal, a root sequence index for generating the reference signal, and a spreading factor value for generating the reference signal.

Optionally, the transmit end determines a cell-specific cyclic shift value by using the first parameter; and the transmit end determines the cyclic shift value by using the cell-specific cyclic shift value.

Optionally, that the transmit end determines a cell-specific cyclic shift value by using the first parameter is implemented in the following manner: The transmit end determines an initial value of a random sequence by using the first parameter; and the transmit end generates the cell-specific cyclic shift value by using the random sequence.

Optionally, the cyclic shift value is determined by using the cell-specific cyclic shift value and the third parameter.

Optionally, the orthogonal sequence index is determined by using the first parameter and a fourth parameter, and the fourth parameter includes at least one of the following: an indication value of the orthogonal sequence index, resource indication information for sending the reference signal, the cyclic shift value for generating the reference signal, a root sequence index for generating the reference signal, and a spreading factor value for generating the reference signal.

Optionally, the root sequence index is determined by using the first parameter and a fifth parameter, and the fifth parameter includes at least one of the following: an indication value of the root sequence index, resource indication information for sending the reference signal, the cyclic shift value for generating the reference signal, an orthogonal sequence index for generating the reference signal, and a spreading factor value for generating the reference signal.

Optionally, the second parameter includes the root sequence index. The transmit end determines an initial value of a random sequence by using the first parameter, and the transmit end generates the root sequence index by using the random sequence.

Optionally, the second parameter includes the root sequence index. The transmit end determines a sequence hop and/or a group hop by using the first parameter, and the transmit end determines the root sequence index by using the sequence hop and/or the group hop.

Optionally, the group hop includes: determining a sequence group number and/or a group hop pattern by using the first parameter, and determining the group hop by using the sequence group number and/or the group hop pattern.

In this way, different reference signals may be generated when any one or more of the first parameters have different values, so that interference between sequences can be reduced or randomized for the reference signals. For example, when terminals with different beams generate reference signals, reference signal sequences generated by the terminals are different, thereby reducing sequence interference between the terminals with different beams and a same time-frequency resource.

Based on the reference signal sending method shown in FIG. 11, the following makes a further detailed description with reference to a specific application scenario.

The reference signal may be a reference signal used to send uplink control information (UCI). For example, the UCI includes a hybrid automatic repeat request (HARQ) acknowledgement message or channel state information (CSI). The reference signal may also be used as a reference signal for demodulation, such as a DMRS, or may be used as a reference signal for channel listening, such as a sounding reference signal (SRS).

For example, the second parameter includes a root sequence number (u) of a sequence, a cyclic shift (CS) value of the sequence, an orthogonal cover code (OCC) of the sequence, and an initial value of the sequence.

The foregoing three types of second parameters are generated based on the first parameter to further eliminate, reduce, or randomize interference generated between sequences. For example, a terminal 1 performs a transmission on a beam 1, and a terminal 2 performs a transmission on a beam 2. When other transmission parameters of the terminal 1 and the terminal 2 are the same, and one of different u, CS, OCC, or initial values of the sequence is selected for the terminal 1 and the terminal 2 based on different beam values, orthogonality between sequences of the terminal 1 and the terminal 2 can be ensured, thereby reducing interference between a plurality of user sequences.

The following separately describes specific methods for generating the root sequence number (u) of the sequence, the cyclic shift (CS) value of the sequence, and the orthogonal cover code (OCC) of the sequence by using the foregoing first parameters.

The method for generating the cyclic shift value of the sequence is as follows:

Manner 1: A common CS value of a cell is generated by using one or more types of the first parameters.

$$n_{CS}^{cell}(n_s,l)=\Sigma_{i=0}^{7}c(8N_{symb}^{UL} \cdot n_s+8l+i) \cdot 2^i \quad \text{formula (17)}$$

Herein, c represents a random function, and an initial value cinit of c may be generated by using one or more types of the first parameters, for example, may be determined in one or more of the following manners:

$2^M N_{BF}+n_{ID}^{RS}$, $2^M N_{BP}+n_{ID}^{RS}$, $2^M N_{RS\text{-}cnf}+n_{ID}^{RS}$, $2^M N_{channel\text{-}type}+n_{ID}^{RS}$, $2^M N_{slot\text{-}type}+n_{ID}^{RS}$, $2^M N_{CFI}+n_{ID}^{RS}$, $2^M N_{SCS}+n_{ID}^{RS}$, and $2^M N_{wave\text{-}form}+n_{ID}^{RS}$.

Further, the initial value cinit of c may be further generated simultaneously by using a plurality of types of the first parameters, for example, $$2^{M+M_1}N_{BF}+2^{M_1}N_{BP}+n_{ID}^{RS} \quad \text{formula (18)}$$

Manner 2: A user-specific CS value is generated by using one or more types of the first parameters and a common CS value of a cell.

For example, one or more of the following manners are determined:

$n_{cs}^{(\tilde{p})}(n_s,l)=[n_{cs}^{cell}(n_s,l)+(N_{BF} \cdot \Delta_{shift}^{PUCCH})] \mod N_{sc}^{RB}$, and $n_{cs}^{(\tilde{p})}(n_s,l)=[n_{cs}^{cell}(n_s,l)+(N_x \cdot \Delta_{shift}^{PUCCH})] \mod N_{sc}^{RB}$.

Nx is used to represent a value of any type of the first parameters.

In Manner 2, in an optional implementation:

Manner a0: The CS value is determined based on a first parameter and an indication information value.

$$n_{cs}^{(\tilde{p})}(n_s,l)=[n_{cs}^{cell}(n_s,l)+N_x+n_{csf}]\bmod N_{sc}^{RB} \quad \text{formula (19)}$$

Herein, $n_{csf}$ is a CS value configured by a base station.

Manner 2a: Terminal-specific cyclic shift values are separately determined for terminals by using one or more types of the first parameters.

Manner 2b: Further, optionally, the user-specific CS value is determined by using the first parameter and an index of a time domain resource on which a terminal is located. The formula in the foregoing example is also related to a slot number "ns" and a symbol number "l".

Manner 2c: Optionally, the user-specific CS value is determined by using the first parameter, and an index of a time domain resource and a frequency domain resource on which a terminal is located.

For example, $$n_{cs}^{(\tilde{p})}(n_s,l)=[n_{cs}^{cell}(n_s,l)+(N_x\cdot\Delta_{shift}^{PUCCH})+n_{PUCCH}^{(\tilde{p})}]\bmod N_{sc}^{RB} \quad \text{formula (20)}$$

Herein, $n_{PUCCH}^{(\tilde{p})}$ indicates an index of a frequency domain resource on an antenna port p.

Manner 2d: Further, optionally, the user-specific CS value is determined by using the first parameter, an index of a time domain resource and a frequency domain resource on which a terminal is located, and the OCC.

For example, $$n_{cs}^{(\tilde{p})}(n_s,l)=[n_{cs}^{cell}(n_s,l)+(N_x\cdot\Delta_{shift}^{PUCCH})+n_{PUCCH}^{(\tilde{p})}+n_{OC}^{(\tilde{p})}(n_s)\bmod\Delta_{shift}^{PUCCH}]\bmod N_{sc}^{RB} \quad \text{formula (21)}$$

Manner 2e: Further, optionally, the CS value is determined by using any method in Manner 2a to Manner 2d and a spreading factor of a terminal.

For example, $$n_{cs}^{(\tilde{p})}(n_s,l)=[n_{cs}^{cell}(n_s,l)+(N_x\cdot\Delta_{shift}^{PUCCH})+n_{PUCCH}^{(\tilde{p})}\cdot N_{SF}+n_{OC}^{(\tilde{p})}(n_s)\bmod\Delta_{shift}^{PUCCH}]\bmod N_{sc}^{RB}.$$

Herein, $N_{SF}$ represents the spreading factor.

The cyclic shift value means a new sequence generated after a cyclic shift is performed on a sequence in a specific length. For example, after a cyclic shift is performed on a ZC sequence or another sequence that has a zero correlation value based on a specific step, there is a zero correlation feature between an original sequence and sequences in different lengths that are obtained after cyclic shifts are performed. When different values of the first parameter are used, an ideal correlation feature (a correlation value is zero) between the sequences may be obtained by using different cyclic shift values of the sequences. Therefore, for different terminals, different cyclic shifts of the sequences are generated based on the foregoing method when a value of a first parameter is different, so that the sequences can be transmitted by using the ideal correlation feature for this parameter. Therefore, during a transmission of a plurality of user sequences, interference between the sequences of an entire system is reduced, and performance of the entire system is improved.

The method for generating a value of the OCC is as follows:

During a sequence transmission, a block spread transmission of a plurality of concatenated sequences may be further performed. One sequence is an OCC sequence, and another sequence is the foregoing direct spread sequence for which a CS value needs to be generated.

In this embodiment of this application, an OCC value of a block spread sequence may be determined based on a first parameter, and the CS value of the direct spread sequence may be further simultaneously determined based on the first parameter.

The OCC usually defines a plurality of orthogonal sequences in a length of a block spread sequence, for example, in Table 2.

TABLE 2

| Sequence index $n_{oc}$ | Orthogonal sequence |
|---|---|
| 0 | [+1 +1 +1 +1] |
| 1 | [+1 −1 +1 −1] |
| 2 | [+1 −1 −1 +1] |

Another example is shown in Table 3.

TABLE 3

| Sequence index $n_{oc}$ | Orthogonal sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Still another example is shown in Table 4.

TABLE 4

| Sequence index $n_{oc}$ | Orthogonal sequence $N_{SF}^{PUCCH} = 5$ | $N_{SF}^{PUCCH} = 4$ |
|---|---|---|
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

In conclusion, an orthogonal sequence in a corresponding length can always be found for block spread spectrum in different lengths. In this embodiment of this application, indexes of orthogonal sequences in different lengths need to be determined, in other words, a specific orthogonal sequence in a specific block spread sequence is used during a transmission needs to be determined. For example, $$n_{oc}^{(\tilde{p})}(n_s)\lfloor(n_{\tilde{p}}(n_s)\cdot\Delta_{shift}^{PUCCH}+N_x)/N\rfloor.$$

For another example, $$n_{oc}^{(\tilde{p})}(n_s)\lfloor(n_{\tilde{p}}(n_s)\cdot\Delta_{shift}^{PUCCH}+N_x+N_y)/N\rfloor,$$

$$n_{oc}^{(\tilde{p})}(n_s)\lfloor(n_{\tilde{p}}(n_s)\cdot\Delta_{shift}^{PUCCH}+N_{x\,shift}^{PUCCH}+N_y)/N\rfloor,$$

and $$n_{oc}^{(\tilde{p})}(n_s)\lfloor(n_{\tilde{p}}(n_s)+N_x+N_y)\cdot\Delta_{shift}^{PUCCH}/N\rfloor$$

Herein, $N_x$ and $N_y$ indicate parameter values of different first parameters.

Specifically, the OCC value may be determined based on one of the following manners:

Manner X0: The OCC value is determined based on a first parameter and an indication information value.

$$n_{oc}^{(\tilde{p})}(n_s)=\lfloor(n_{ocf}+N_x)/N\rfloor$$

Herein, $n_{ocf}$ is an OCC value configured by the base station.

Manner X1: The OCC value is determined based on a first parameter and a time-frequency resource, for example, $$n_{oc}^{(\tilde{p})}(n_s)=\lfloor(n_{\tilde{p}}(n_s)\cdot\Delta_{shift}^{PUCCH}+N_x)/N\rfloor.$$

Manner X2: The OCC value is determined based on a first parameter and a CS value, for example, $$n_{oc}^{(\tilde{p})}(n_s)=\lfloor (n_{cs}^{\tilde{p}}(n_s)\cdot\Delta_{shift}^{PUCCH}+N_x)/N \rfloor.$$

Manner X3: The OCC value is determined based on a first parameter and a value of u, for example, $$n_{oc}^{(\tilde{p})}(n_s)=\lfloor (n_{cs}^{\tilde{p}}(n_s)\cdot\Delta_{shift}^{PUCCH}+u)/N \rfloor.$$

Manner X4: The OCC value is determined based on a first parameter, and a CS value and a value of u, for example, $$n_{oc}^{(\tilde{p})}(n_s)=\lfloor (n_{cs}^{\tilde{p}}(n_s)\cdot\Delta_{shift}^{PUCCH}+N_x+u)/N \rfloor.$$

Manner X5: The OCC value is determined based on a first parameter, and a time-frequency resource, a CS value, and a value of u, for example, $$n_{oc}^{(\tilde{p})}(n_s)=\lfloor (n_{cs}^{\tilde{p}}(n_s)\cdot\Delta_{shift}^{PUCCH}+n_{\tilde{p}}(n_s)N_x+u)/N \rfloor.$$

In this embodiment of this application, it is proposed that first parameters are used to generate an OCC value, to further randomize interference on a block spread sequence. When different terminals perform transmissions based on different values of the first parameters, orthogonality between these terminals is ensured, so that transmitted first parameters can be orthogonal between different terminals, thereby reducing interference between a plurality of users when the first parameters are transmitted. For example, a terminal 1 performs a transmission on a beam 1, and a terminal 2 performs a transmission on a beam 2. When other transmission parameters of the terminal 1 and the terminal 2 are the same, and different values of an OCC are selected for the terminal 1 and the terminal 2 based on different beam values, orthogonality between sequences of the terminal 1 and the terminal 2 can be ensured, thereby reducing interference between a plurality of user sequences.

The method for generating a value of the root sequence number is as follows:

To determine a root sequence number of a ZC sequence is to determine the following parameter q:

$$x_q(m) = e^{-j\frac{\pi qm(m+1)}{N_{ZC}^{RS}}}, \quad 0 \le m \le N_{ZC}^{RS}-1.$$

Herein, q represents the root sequence number of the ZC sequence, $N_{ZC}^{RS}$ represents a length of the ZC sequence, and m is an independent variable of a generation sequence.

A determining manner may be any one of the following:

Manner 1: The parameter q is directly determined based on a first parameter:

$$q=N_x.$$

Optionally, the parameter q may be further determined by using a plurality of first parameters:

$$q=N_x+N_y.$$

Manner 2: The parameter q is determined by using a configured parameter and a first parameter:

$$q=q_0+N_x.$$

Optionally, the parameter q may be further determined by using a configured parameter and a plurality of first parameters:

$$q=q_0+N_x+N_y.$$

Manner 3: The parameter q is determined by using a first parameter and indication information of a frequency domain resource:

$$q=n_p+N_x.$$

$n_p$ indicates a used frequency domain resource.

Manner 4: The parameter q is determined by using a first parameter and indication information of a time domain resource:

$$q=n_s+N_x.$$

$n_s$ indicates a current slot index.

Manner 5: The parameter q is determined by using a first parameter and indication information of a time domain resource and a frequency domain resource:

$$q=n_s+n_p+N_x.$$

Manner 6: The parameter q is determined by using a sequence hop and a sequence group hop, where any one of the sequence hop and the sequence group hop is determined by using a first parameter.

For example, $$q=\lfloor \bar{q}+\frac{1}{2}\rfloor \pm v\cdot(-1)^{\lfloor 2\bar{q}\rfloor}$$

$$\bar{q}=N_{ZC}^{RS}\cdot(u+1)/31$$

u is a sequence group hop parameter:

$$u=(f_{gh}(n_s)+f_{ss})\bmod 30.$$

Herein, $f_{gh}(n_s)$ is a group hop template, and $f_{ss}$ is a sequence hop shift template.

Herein, $$f_{gh}(n_s)=(\Sigma_{i=0}^{7}c(8n_s+i)\cdot 2^i)\bmod 30,$$

$$f_{ss}^{PUCCH}=n_{ID}^{RS} \bmod 30, \text{ and}$$

$$f_{ss}^{PUSCH}=(N_{ID}^{cell}+\Delta_{ss})\bmod 30.$$

In this embodiment of this application, $f_{gh}(n_s)$ and/or $f_{ss}$ may be generated in one of the following manners:

Manner 1: $f_{gh}(n_s)$ is directly generated by using a first parameter. A generation manner is the same as the foregoing generation manner of a value of q, but a modulo operation needs to be performed only on a constant.

For example, $$f_{gh}(n_s)=n_s \bmod 30$$

$$f_{gh}(n_s)=(n_s+N_x)\bmod 30$$

$$f_{gh}(n_s)=(n_s+n_p+N_x)\bmod 30, \text{ and}$$

$$f_{gh}(n_s)=(n_s+n_p+N_x+N_{ID}^{cell})\bmod 30.$$

Manner 2: The sequence $f_{gh}(n_s)$ is generated by using a random function, and then an initial value of the random function is generated by using a first parameter.

For example, $$c_{init}=n_s \bmod 30$$

$$c_{init}=n_s/30,$$

$$c_{init}=(n_s+N_x),$$

$$c_{init}=(n_s+n_p+N_x), \text{ and}$$

$$c_{init}=(N_{ID}^{cell}+n_s+n_p+N_x).$$

Alternatively, $$c_{init} = n_s \bmod 30$$

$$c_{init} = n_s/30,$$

$$c_{init} = (n_s + 2^M \cdot N_x),$$

$$c_{init} = (n_s + 2^{M+M_1} \cdot n_p + 2^M \cdot N_x), \text{ and}$$

$$c_{init} = (2^{M+M_1+M_2} N_{ID}^{cell} + 2^{M+M_1} \cdot n_s + 2^M n_p + N_x).$$

A generation manner of $f_{ss}$ is the same as Manner 1 of generating $f_{gh}(n_s)$ v is a sequence hop parameter.

$$v = \begin{cases} c(n_s) & \text{A group hop is off while a sequence hop is on} \\ 0 & \text{Others} \end{cases}$$

A generation manner of v is the same as Manner 2 of generating $f_{gh}(n_s)$.

Figure 12:
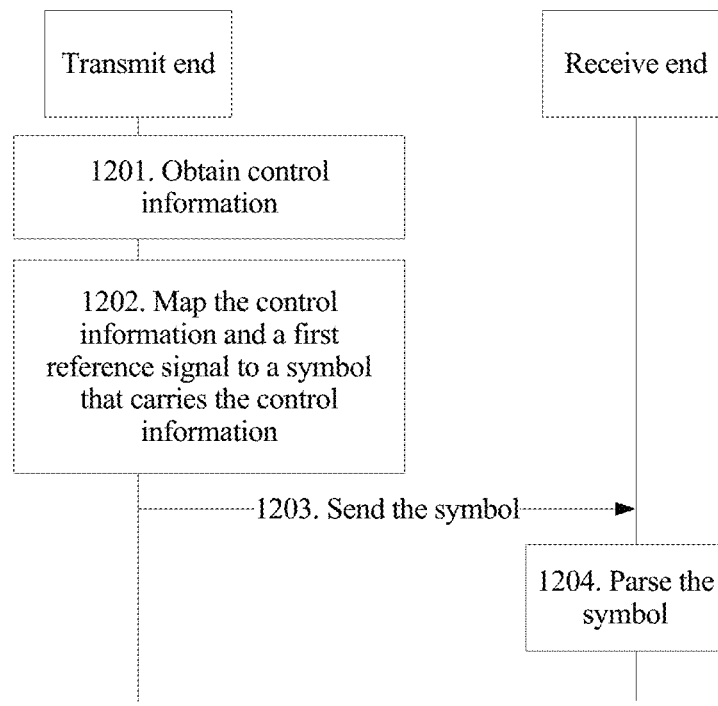
FIG. 12 is a schematic flowchart of a control information sending method according to an embodiment of this application.

Based on the architecture of the system shown in FIG. 1, as shown in FIG. 12, an embodiment of this application further provides a control information sending method, and a specific procedure is as follows:

Step 1201: A transmit end obtains control information.

Step 1202: The transmit end maps the control information and a first reference signal to a symbol that carries the control information, where the first reference signal is used to demodulate the control information, and the control information and the first reference signal are time division or frequency division multiplexed in the symbol.

Step 1203: The transmit end sends the symbol, and a receive end receives the symbol.

Step 1204: The receive end parses the symbol.

A method used by the receive end to parse the symbol is similar to a method used by the transmit end to send the control information. No repeated description is provided.

Optionally, the control information and the first reference signal are frequency division multiplexed in the symbol, and the transmit end sends the symbol after spectrum spreading is performed for the control information by using a first frequency domain spreading factor.

Optionally, the transmit end maps a second reference signal to the symbol that carries the control information, where the control information, the first reference signal, and the second reference signal are frequency division multiplexed in the symbol, and the second reference signal is a sounding signal.

Correspondingly, the transmit end sends the symbol after performing spectrum spreading for the control information by using a second frequency domain spreading factor.

Optionally, the second spreading factor is less than the first spreading factor.

Optionally, the second reference signal occupies a frequency domain resource on which the first reference signal is located.

Optionally, the first reference signal and the second reference signal are code division multiplexed, or one of the first reference signal and the second reference signal is not sent.

Optionally, after converting the control information arranged according to a preset rule and the first reference signal into frequency domain signals, the transmit end maps the frequency domain signals to frequency domain resources corresponding to the symbol.

Optionally, the transmit end maps the frequency domain signals to a subcarrier on which the second reference signal is not located and that is on the frequency domain resources corresponding to the symbol.

Optionally, the transmit end allocates transmit power based on priorities when the transmit power is limited, where a descending order of the priorities is from the control information to the second reference signal.

Optionally, the transmit end allocates transmit power based on priorities when the transmit power is limited, where the transmit end determines an order of priorities of the control information and the second reference signal based on a message type included in the control information.

Optionally, when transmit power is limited, the transmit end discards the second reference signal, and sends the control information.

Optionally, when transmit power is limited, the transmit end discards the second reference signal, and sends information with a higher priority in the control information.

Optionally, the symbol includes a first time domain resource and a second time domain resource. When transmit power is limited, the transmit end maps the control information and the first reference signal to the first time domain resource for sending, and maps the second reference signal to the second time domain resource for sending.

Optionally, the symbol includes a first time domain resource and a second time domain resource. When transmit power is limited, the transmit end maps a first part of the control information and the first reference signal to the first time domain resource for sending, and maps a second part of the control information and the second reference signal to the second time domain resource for sending.

Optionally, a quantity of symbols that carry the control information is 1 or 2.

Optionally, the quantity of symbols that carry the control information is 2, the first reference signal is in the first symbol, and the control information and the second reference signal are in the second symbol.

Optionally, the second reference signal is any one of the following: a sounding reference signal, a demodulation reference signal, a positioning reference signal, a phase tracking reference signal, channel state information reference information, and a reference signal for transmitting control information.

Optionally, the first reference signal and the second reference signal are used for different subcarrier spacings or different service types or different channel types, which may be different control channel types or may be different control channel types and different service channel types.

Based on the control information sending method shown in FIG. 12, the following makes a further detailed description with reference to a specific application scenario.

For example, the control information is a PUCCH, the first reference signal is a DMRS, and the second reference signal is an SRS.

Currently, a 1-symbol PUCCH and a 2-symbol PUCCH may be used. In the two PUCCH formats, in this embodiment of this application, the 1-symbol PUCCH and the 2-symbol PUCCH are simultaneously transmitted with the SRS.

Figure 13:
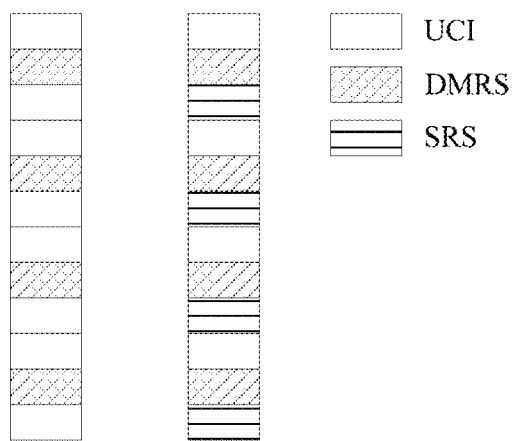
FIG. 13 is a schematic diagram of multiplexing UCI in a 1-symbol PUCCH and an SRS according to an embodiment of this application.

A method for multiplexing an SRS and a PUCCH in one symbol is shown in FIG. 13. FIG. 13 is a schematic diagram of multiplexing UCI in a 1-symbol PUCCH and an SRS.

In a possible implementation, the UCI and the DMRS for demodulation are frequency division multiplexed in one symbol, and a spreading factor of the UCI in frequency domain is adjusted based on whether an SRS exists.

As shown in FIG. 13, in a symbol that occupies 12 REs, a DMRS occupies four REs, and the UCI occupies eight REs. The UCI may be transmitted by using a spreading factor of 8 or 4.

A manner of multiplexing the UCI and the DMRS in the symbol in which the PUCCH is located may be frequency division multiplexing, or the UCI and the DMRS may be mapped, before DFT transform, to the symbol in which the PUCCH is located. This is not limited in this embodiment of this application.

When the SRS also needs to be transmitted in the symbol of the PUCCH, the SRS occupies some REs in the UCI. As shown in FIG. 13, if the SRS occupies four of the eight REs occupied by the UCI, a spreading factor of the UCI is correspondingly decreased to half of the original spreading factor, to be specific, to four REs or two REs.

Figure 14:
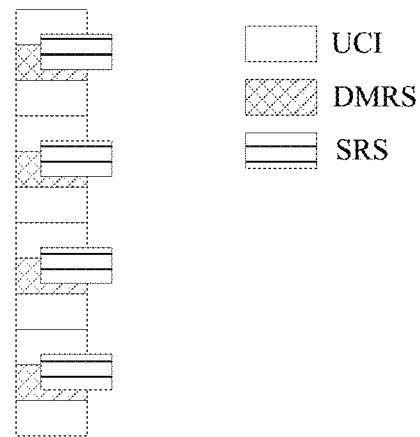
FIG. 14 is a schematic diagram of code division multiplexing a DMRS and an SRS according to an embodiment of this application.

In a possible implementation, the DMRS and the SRS may be alternatively code division multiplexed. As shown in FIG. 14, a DMRS and an SRS occupy same REs, and then code division is performed between the DMRS and the SRS by using different sequences.

Figure 15:
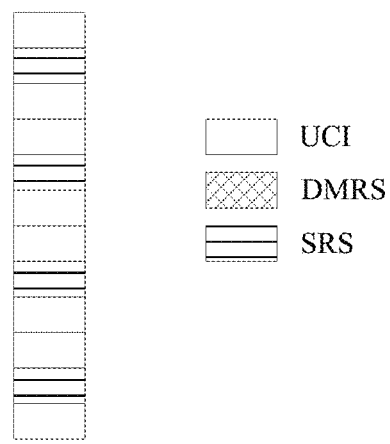
FIG. 15 is a schematic diagram of sharing same REs by a DMRS and an SRS according to an embodiment of this application.

In a possible implementation, as shown in FIG. 15, a DMRS and an SRS share same REs, and only one reference signal is sent. In other words, the DMRS is discarded, and only the SRS is sent.

Further, when UCI and the SRS are transmitted in a same symbol and uplink transmit power of a terminal is limited, transmit power values of the UCI and the SRS need to be determined in the following manner.

Manner 0: Transmit power is allocated between the UCI and the SRS based on a configured parameter.

Manner 1: Transmit power is preferably allocated to a subcarrier on which the UCI is located, and power of a subcarrier on which the SRS is located is correspondingly decreased.

Manner 2: The to-be-sent SRS is directly discarded.

Manner 3: Priorities of power of the UCI and the SRS are determined based on content of signaling included in the UCI. If the UCI includes a HARQ acknowledgement message, the UCI has a higher priority. If a CQI in CSI is transmitted in the UCI, a priority of the CQI is lower or the CQI has a same priority as the SRS.

During power allocation, power is preferably allocated to a message with a higher priority, and a message with a lower priority is preferably discarded. When the priorities of the UCI and the SRS are the same, the power of the UCI and the power of the SRS are decreased in the same ratio.

Figure 16:
FIG. 16 is a schematic diagram of alternately sending UCI and an SRS according to an embodiment of this application.

Manner 4: The UCI and the SRS are sent in different slots. For example, as shown in FIG. 16, if a 1-symbol PUCCH appears every two slots, UCI and an SRS may be alternately sent at different PUCCH locations.

This manner is only applicable to a scenario in which a priority of information in the transmitted UCI is not higher than that of the SRS. Otherwise, relatively large negative impact is caused to sending of the UCI.

Manner 5: The UCI is divided into different parts, and some parts are sent in a slot in which the UCI is separately located. For example, the UCI may be an ACK or a NACK, beam information, or a PMI. The other parts are sent with the SRS in a same symbol. For example, the UCI may be a CQI or an RI.

Figure 17A:
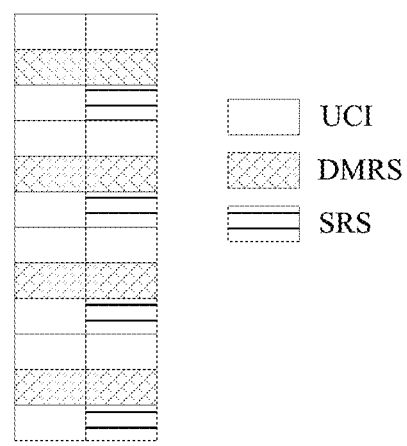
FIG. 17*a* to FIG. 17*c* are each a schematic diagram of an SRS and PUCCH multiplexing method according to an embodiment of this application.
Figure 17B:
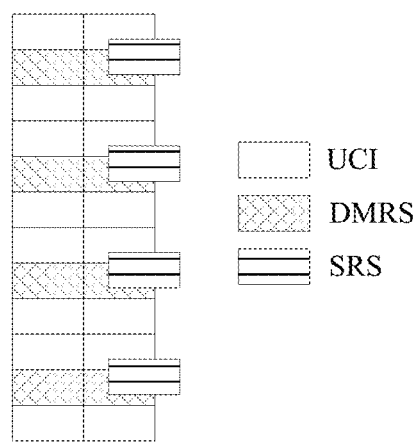
Figure 17C:
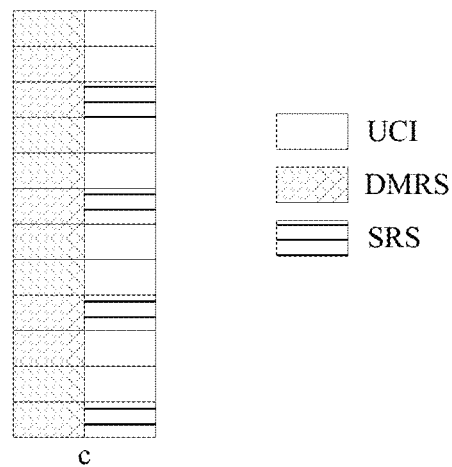

A method for multiplexing an SRS and a PUCCH in two symbols is shown in FIG. 17a to FIG. 17c.

Manners for multiplexing a DMRS and UCI include frequency division multiplexing and time division multiplexing.

For the frequency division multiplexing manner, refer to FIG. 17a and FIG. 17b. For the frequency division multiplexing manner, refer to FIG. 17a and FIG. 17c. In FIG. 17c, a DMRS occupies the first symbol, and UCI occupies the second symbol.

Manners of multiplexing the SRS and the UCI are as follows:

Manner 1: Frequency division multiplexing. The SRS occupies REs of the UCI in the second PUCCH symbol, and other remaining REs that are not of the DMRS are used to transmit the UCI. This is shown in FIG. 17a.

Manner 2: Code division multiplexing. As shown in FIG. 17b, this case is the same as that in the 1-symbol PUCCH.

Manner 3: The SRS and the DMRS share a same RE. This case is shown in FIG. 17b, only the SRS may be sent on a symbol in which the SRS is located, but the DMRS is not sent on the symbol.

In this embodiment of the present invention, according to the foregoing method, an SRS and a PUCCH can be simultaneously sent, and an opportunity of preferably sending UCI can also be ensured.

Figure 18:
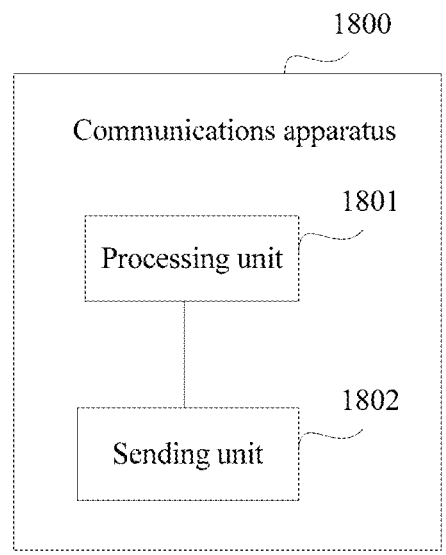
FIG. 18 to FIG. 21 are each a schematic structural diagram of a communications apparatus according to an embodiment of this application.

Based on a same inventive concept as the communication method shown in FIG. 4, as shown in FIG. 18, an embodiment of this application further provides a communications apparatus 1800. The communications apparatus 1800 is configured to perform the communication method shown in FIG. 4, and the communications apparatus 1800 includes:

a processing unit 1801, configured to obtain a frequency hopping parameter and resource allocation information of a to-be-transmitted message, where the frequency hopping parameter includes at least one of bandwidth part indication information, beam indication information, reference signal configuration information, subcarrier spacing indication information, transmission waveform indication information, slot type indication information, channel type indication information, and transmission carrier indication information, where the processing unit 1801 is further configured to determine, based on the resource allocation information and the frequency hopping parameter, a physical resource used to send the to-be-transmitted message, where the physical resource includes information about a frequency domain resource on which the to-be-transmitted message is mapped in at least one time unit; and a sending unit 1802, configured to send the to-be-transmitted message by using the physical resource determined by the processing unit 1801.

Optionally, the frequency hopping parameter includes the bandwidth part indication information.

The processing unit 1801 is specifically configured to: determine a first frequency domain resource value in one bandwidth part based on the resource allocation information and the bandwidth part indication information; determine a second frequency domain resource value in the bandwidth part based on the resource allocation information and the bandwidth part indication information; and determine the physical resource based on the first frequency domain resource value and/or the second frequency domain resource value.

Optionally, the frequency hopping parameter includes at least one of the beam indication information, the reference signal configuration information, the subcarrier spacing indication information, the transmission waveform indication information, the slot type indication information, the channel type indication information, and the transmission carrier indication information.

Optionally, the processing unit 1801 is specifically configured to: determine the physical resource based on the resource allocation information, the frequency hopping parameter, and a configured frequency domain offset value; or determine an initial value of a third random sequence based on the resource allocation information and the frequency hopping parameter, generate the third random sequence, and determine the physical resource based on the third random sequence.

Optionally, the time unit includes at least one slot, or the time unit includes at least one symbol in one slot.

Optionally, the time unit includes at least two slots. The sending unit 1802 is specifically configured to send the to-be-transmitted message in a manner of binding reference signals in the at least two slots and by using a same frequency domain resource.

Optionally, the processing unit 1801 is further configured to obtain a frequency hopping type, where the frequency hopping type is used to indicate a manner of determining a physical resource used by the transmit end to obtain the to-be-transmitted message.

Optionally, the processing unit 1801 obtains the frequency hopping type by using at least one of the following indication information: indication information of a bandwidth part allocated to the communications apparatus 1800 and indication information of resource allocation in a bandwidth part.

Figure 19:
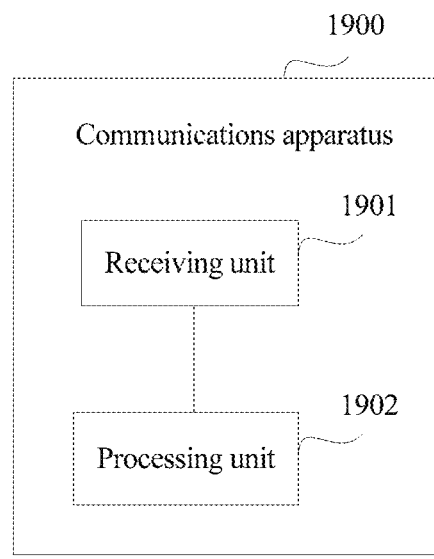

Based on a same inventive concept as the communication method shown in FIG. 4, as shown in FIG. 19, an embodiment of this application further provides a communications apparatus 1900. The communications apparatus 1900 is configured to perform the communication method shown in FIG. 4, and the communications apparatus 1900 includes:

a receiving unit 1901, configured to receive a to-be-demodulated message sent by a transmit end; and a processing unit 1902, configured to obtain a frequency hopping parameter and resource allocation information of the to-be-demodulated message received by the receiving unit 1901, where the frequency hopping parameter includes at least one of bandwidth part indication information, beam indication information, reference signal configuration information, subcarrier spacing indication information, transmission waveform indication information, slot type indication information, channel type indication information, and transmission carrier indication information, where the processing unit 1902 is further configured to: determine, based on the resource allocation information and the frequency hopping parameter, a physical resource used by the to-be-demodulated message, where the physical resource includes information about a frequency domain resource on which the to-be-demodulated message is mapped in at least one time unit; and demodulate the to-be-demodulated message by using the physical resource.

Optionally, the frequency hopping parameter includes the bandwidth part indication information. The processing unit 1902 is specifically configured to: determine a first frequency domain resource value in one bandwidth part based on the resource allocation information and the bandwidth part indication information; determine a second frequency domain resource value in the bandwidth part based on the resource allocation information and the bandwidth part indication information; and determine the physical resource based on the first frequency domain resource value and/or the second frequency domain resource value.

Optionally, the frequency hopping parameter includes at least one of the beam indication information, the reference signal configuration information, the subcarrier spacing indication information, the transmission waveform indication information, the slot type indication information, the channel type indication information, and the transmission carrier indication information.

Optionally, the processing unit 1902 is specifically configured to: determine the physical resource based on the resource allocation information, the frequency hopping parameter, and a configured frequency domain offset value; or determine an initial value of a third random sequence based on the resource allocation information and the frequency hopping parameter, generate the third random sequence, and determine the physical resource based on the third random sequence.

Optionally, the time unit includes at least one slot, or the time unit includes at least one symbol in one slot.

Optionally, the time unit includes at least two slots. The processing unit 1902 is specifically configured to demodulate the to-be-demodulated message in a manner of binding reference signals in the at least two slots and by using a same frequency domain resource.

Optionally, the processing unit 1902 is further configured to obtain a frequency hopping type, where the frequency hopping type is used to indicate a manner of determining the physical resource used by the receive end to obtain the to-be-demodulated message.

Optionally, the processing unit 1902 obtains the frequency hopping type by using at least one of the following indication information: indication information of a bandwidth part of the to-be-demodulated message and indication information of resource allocation in a bandwidth part of the to-be-demodulated message.

Figure 20:
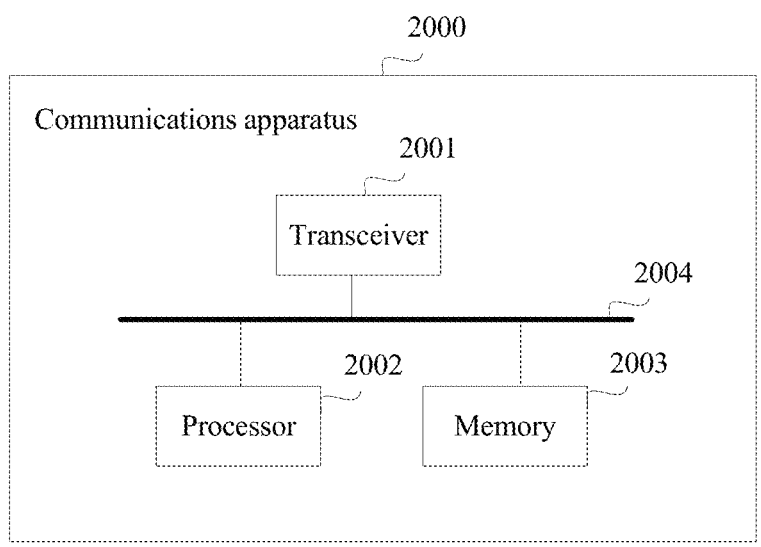

Based on a same inventive concept as the communication method shown in FIG. 4, as shown in FIG. 20, an embodiment of this application further provides a communications apparatus 2000. The communications apparatus 2000 may be configured to perform the method shown in FIG. 4. The communications apparatus 2000 includes a transceiver 2001, a processor 2002, a memory 2003, and a bus 2004. The processor 2002 and the memory 2003 are connected by using the bus 2004. The processor 2002 is configured to execute code in the memory 2003, and when the code is executed, the processor 2002 performs the communication method shown in FIG. 4.

The processor 2002 may be a central processing unit (CPU), a network processor (NP), or a combination of a CPU and an NP.

The processor 2002 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 2003 may include a volatile memory, such as a random-access memory (RAM). Alternatively, the memory 2003 may include a non-volatile memory, such as a flash memory, a hard disk (HDD), or a solid-state drive (SSD). Alternatively, the memory 2003 may include a combination of the foregoing types of memories.

Figure 21:
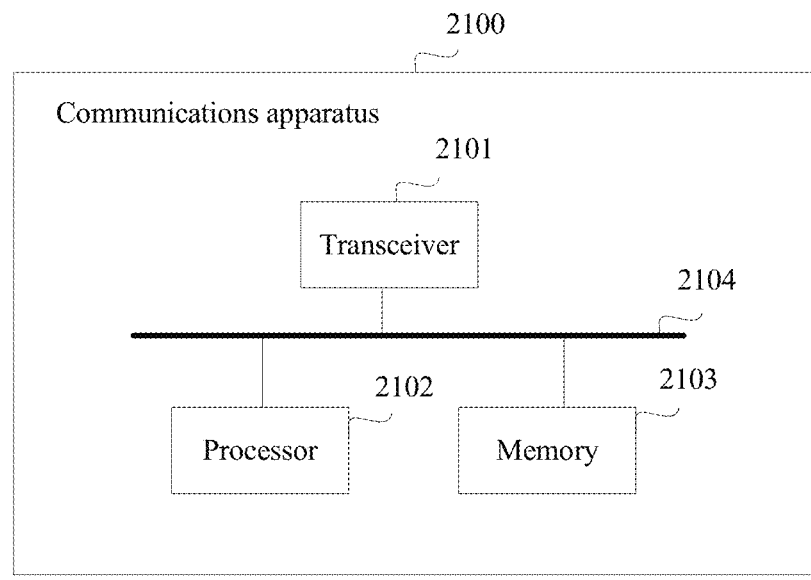

Based on a same inventive concept as the communication method shown in FIG. 4, as shown in FIG. 21, an embodiment of this application further provides a communications apparatus 2100. The communications apparatus 2100 may be configured to perform the method shown in FIG. 4. The communications apparatus 2100 includes a transceiver 2101, a processor 2102, a memory 2103, and a bus 2104. The processor 2102 and the memory 2103 are connected by using the bus 2104. The processor 2102 is configured to execute code in the memory 2103, and when the code is executed, the processor 2102 performs the communication method shown in FIG. 4.

The processor 2102 may be a central processing unit (CPU), a network processor (NP), or a combination of a CPU and an NP.

The processor 2102 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 2103 may include a volatile memory, such as a random-access memory (RAM). Alternatively, the memory 2103 may include a non-volatile memory, such as a flash memory, a hard disk (HDD), or a solid-state drive (SSD). Alternatively, the memory 2103 may include a combination of the foregoing types of memories.

It should be noted that the communications apparatuses provided in FIG. 18 and FIG. 19 may be configured to implement the communication method shown in FIG. 4. In a specific implementation, the processing unit 1801 in FIG. 18 may be implemented by using the processor 2002 in FIG. 20, and the sending unit 1802 may be implemented by using the transceiver 2001 in FIG. 20. The processing unit 1902 in FIG. 19 may be implemented by using the processor 2102 in FIG. 21, and the receiving unit 1901 may be implemented by using the transceiver 2101 in FIG. 21.

In the communications system 100 provided in FIG. 1 in the embodiments of this application, the transmit end 101 may be a device provided in the embodiment corresponding to FIG. 18 or FIG. 20. The receive end 102 may be a device provided in the embodiment corresponding to FIG. 19 or FIG. 21. The communications system 100 is configured to perform the method in the embodiment corresponding to FIG. 4.

Figure 22:
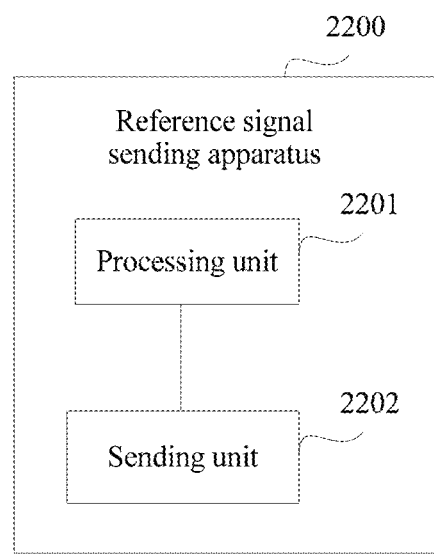
FIG. 22 is a schematic structural diagram of a reference signal sending apparatus according to an embodiment of this application.

Based on a same inventive concept as the reference signal sending method shown in FIG. 11, as shown in FIG. 22, an embodiment of this application further provides a reference signal sending apparatus 2200. The reference signal sending apparatus 2200 is configured to perform the reference signal sending method shown in FIG. 11, and the reference signal sending apparatus 2200 includes:

a processing unit 2201, configured to determine a reference signal sequence based on a first parameter, where the first parameter includes at least one of the following: bandwidth part indication information, beam indication information, reference signal configuration information, subcarrier spacing indication information, transmission waveform indication information, slot type indication information, channel type indication information, and transmission carrier indication information, where the processing unit 2201 is further configured to generate a reference signal by using the reference signal sequence; and a sending unit 2202, configured to send the reference signal.

Optionally, the reference signal includes at least one of the following: a demodulation reference signal, a reference signal for transmitting control information, a sounding reference signal, a positioning reference signal, channel state information reference information, and a phase tracking reference signal.

Optionally, the transmit end determines a second parameter based on the first parameter, where the second parameter includes at least one of the following: a cyclic shift value, an orthogonal sequence index, a root sequence index, and an initial value; and determines the reference signal sequence based on the second parameter.

If the second parameter includes the cyclic shift value, correspondingly, the transmit end determines the cyclic shift value based on the first parameter and a third parameter, where the third parameter includes at least one of the following: an indication value of the cyclic shift value, resource indication information for sending the reference signal, an orthogonal sequence index for generating the reference signal, a root sequence index for generating the reference signal, and a spreading factor value for generating the reference signal.

Optionally, the transmit end determines a cell-specific cyclic shift value by using the first parameter; and the transmit end determines the cyclic shift value by using the cell-specific cyclic shift value.

Optionally, that the transmit end determines a cell-specific cyclic shift value by using the first parameter is implemented in the following manner: The transmit end determines an initial value of a random sequence by using the first parameter; and the transmit end generates the cell-specific cyclic shift value by using the random sequence.

Optionally, the cyclic shift value is determined by using the cell-specific cyclic shift value and the third parameter.

Optionally, the orthogonal sequence index is determined by using the first parameter and a fourth parameter, and the fourth parameter includes at least one of the following: an indication value of the orthogonal sequence index, resource indication information for sending the reference signal, the cyclic shift value for generating the reference signal, a root sequence index for generating the reference signal, and a spreading factor value for generating the reference signal.

Optionally, the root sequence index is determined by using the first parameter and a fifth parameter, and the fifth parameter includes at least one of the following: an indication value of the root sequence index, resource indication information for sending the reference signal, the cyclic shift value for generating the reference signal, an orthogonal sequence index for generating the reference signal, and a spreading factor value for generating the reference signal.

Optionally, the second parameter includes the root sequence index. The transmit end determines an initial value of a random sequence by using the first parameter, and the transmit end generates the root sequence index by using the random sequence.

Optionally, the second parameter includes the root sequence index. The transmit end determines a sequence hop and/or a group hop by using the first parameter, and the transmit end determines the root sequence index by using the sequence hop and/or the group hop.

Optionally, the group hop includes: determining a sequence group number and/or a group hop pattern by using the first parameter, and determining the group hop by using the sequence group number and/or the group hop pattern.

Figure 23:
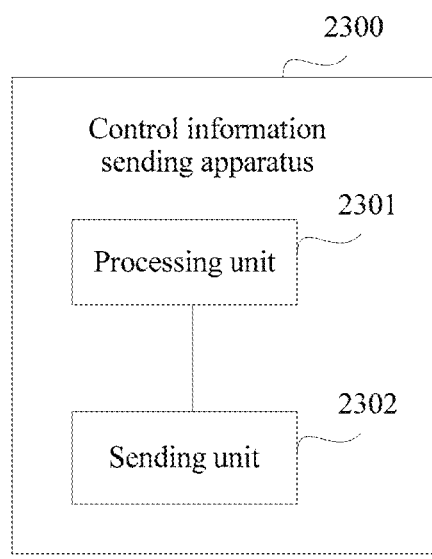
FIG. 23 is a schematic structural diagram of a control information sending apparatus according to an embodiment of this application.

Based on a same inventive concept as the control information sending method shown in FIG. 12, as shown in FIG. 23, an embodiment of this application further provides a control information sending apparatus 2300. The control information sending apparatus 2300 is configured to perform the control information sending method shown in FIG. 12, and the control information sending apparatus 2300 includes:

a processing unit 2301, configured to obtain control information, where the processing unit 2301 is further configured to map the control information and a first reference signal to a symbol that carries the control information, where the first reference signal is used to demodulate the control information, and the control information and the first reference signal are time division or frequency division multiplexed in the symbol; and a sending unit 2302, configured to send the symbol.

Optionally, the control information and the first reference signal are frequency division multiplexed in the symbol, and the transmit end sends the symbol after spectrum spreading is performed for the control information by using a first frequency domain spreading factor.

Optionally, the transmit end maps a second reference signal to the symbol that carries the control information, where the control information, the first reference signal, and the second reference signal are frequency division multiplexed in the symbol, and the second reference signal is a sounding signal.

Correspondingly, the transmit end sends the symbol after performing spectrum spreading for the control information by using a second frequency domain spreading factor.

Optionally, the second spreading factor is less than the first spreading factor.

Optionally, the second reference signal occupies a frequency domain resource on which the first reference signal is located.

Optionally, the first reference signal and the second reference signal are code division multiplexed, or one of the first reference signal and the second reference signal is not sent.

Optionally, after converting the control information arranged according to a preset rule and the first reference signal into frequency domain signals, the transmit end maps the frequency domain signals to frequency domain resources corresponding to the symbol.

Optionally, the transmit end maps the frequency domain signals to a subcarrier on which the second reference signal is not located on the frequency domain resources corresponding to the symbol.

Optionally, the transmit end allocates transmit power based on priorities when the transmit power is limited, where descending order of the priorities is from the control information to the second reference signal.

Optionally, the transmit end allocates transmit power based on priorities when the transmit power is limited, where the transmit end determines order of priorities of the control information and the second reference signal based on a message type included in the control information.

Optionally, when transmit power is limited, the transmit end discards the second reference signal, and sends the control information.

Optionally, when transmit power is limited, the transmit end discards the second reference signal, and sends information with a higher priority in the control information.

Optionally, the symbol includes a first time domain resource and a second time domain resource. When transmit power is limited, the transmit end maps the control information and the first reference signal to the first time domain resource for sending, and maps the second reference signal to the second time domain resource for sending.

Optionally, the symbol includes a first time domain resource and a second time domain resource. When transmit power is limited, the transmit end maps a first part of the control information and the first reference signal to the first time domain resource for sending, and maps a second part of the control information and the second reference signal to the second time domain resource for sending.

Optionally, a quantity of symbols that carry the control information is 1 or 2.

Optionally, the quantity of symbols that carry the control information is 2, the first reference signal is in the first symbol, and the control information and the second reference signal are in the second symbol.

Optionally, the second reference signal is any one of the following: a sounding reference signal, a demodulation reference signal, a positioning reference signal, a phase tracking reference signal, channel state information reference information, and a reference signal for transmitting control information.

Optionally, the first reference signal and the second reference signal are used for different subcarrier spacings or different service types or different channel types, which may be different control channel types or may be different control channel types and different service channel types.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Apparently, persons skilled in the art can make various modifications and variations to the embodiments of this application without departing from the spirit and scope of the embodiments of this application. In this way, this application is intended to cover these modifications and variations made to the embodiments of this application provided that they fall within the scope of the claims and their equivalent technologies of this application.

What is claimed is:

1. A communication method, comprising:
obtaining, by a terminal, bandwidth part indication information and resource allocation information of a message, wherein the message comprises first data and second data;
determining, by the terminal based on the bandwidth part indication information and the resource allocation information of the message, a physical resource of the message, wherein the physical resource of the message comprises a first slot, a first frequency domain resource, and a second frequency domain resource;
sending a first reference signal and the first data on a portion of symbols in the first slot and on the first frequency domain resource; and
sending a second reference signal and the second data on a remaining portion of the symbols in the first slot and on the second frequency domain resource, wherein the second reference signal occupies the first symbol of the remaining portion of the symbols in the first slot.

2. The method according to claim 1, wherein the bandwidth part indication information comprises indication of a bandwidth part occupied by the message, and a size of a bandwidth part in a carrier bandwidth carrying the message.

3. The method according to claim 1, wherein the resource allocation information of the message comprises a resource allocation of the message within a bandwidth part occupied by the message.

4. The method according to claim 1, wherein the second data occupies symbols other than the first symbol of the remaining portion of the symbols in the first slot.

5. The method according to claim 1, further comprising:
obtaining, by the terminal, slot type indication information; and
wherein determining the physical resource of the message comprises:
determining, by the terminal based on the slot type indication information, the bandwidth part indication information, and the resource allocation information of the message, the physical resource of the message.

6. A communication method, comprising:
obtaining, by a base station, bandwidth part indication information and resource allocation information of a message, wherein the message comprises first data and second data;
determining, by the base station based on the bandwidth part indication information and the resource allocation information of the message, a physical resource of the message, wherein the physical resource of the message comprises a first slot, a first frequency domain resource, and a second frequency domain resource;
receiving, by the base station, a first reference signal and the first data on a portion of symbols in the first slot and on the first frequency domain resource; and
receiving, by the base station, a second reference signal and the second data on a remaining portion of the symbols in the first slot and on the second frequency domain resource, wherein the second reference signal occupies the first symbol of the remaining portion of the symbols in the first slot.

7. The method according to claim 6, wherein the bandwidth part indication information comprises indication of a bandwidth part occupied by the message, and a size of a bandwidth part in a carrier bandwidth carrying the message.

8. The method according to claim 6, wherein the resource allocation information of the message comprises a resource allocation of the message within a bandwidth part occupied by the message.

9. The method according to claim 6, wherein the second data occupies symbols other than the first symbol of the remaining portion of the symbols in the first slot.

10. The method according to claim 6, further comprising:
obtaining, by the base station, slot type indication information; and
wherein determining the physical resource of the message comprises:
determining, by the base station based on the slot type indication information, the bandwidth part indication information, and the resource allocation information of the message, the physical resource of the message.

11. An apparatus, comprising:
a non-transitory computer-readable storage medium including executable instructions; and
at least one processor, wherein the executable instructions, when executed by the at least one processor, cause the apparatus to:
obtain bandwidth part indication information and resource allocation information of a message, wherein the message comprises first data and second data;
determine, based on the bandwidth part indication information and the resource allocation information of the message, a physical resource of the message, wherein the physical resource of the message comprises a first slot, a first frequency domain resource, and a second frequency domain resource;
send a first reference signal and the first data on a portion of symbols in the first slot and on the first frequency domain resource; and
send a second reference signal and the second data on a remaining portion of the symbols in the first slot and on the second frequency domain resource, wherein the second reference signal occupies the first symbol of the remaining portion of the symbols in the first slot.

12. The apparatus according to claim 11, wherein the bandwidth part indication information comprises indication of a bandwidth part occupied by the message, and a size of a bandwidth part in a carrier bandwidth carrying the message.

13. The apparatus according to claim 11, wherein the resource allocation information of the message comprises a resource allocation of the message within a bandwidth part occupied by the message.

14. The apparatus according to claim 11, wherein the second data occupies symbols other than the first symbol of the remaining portion of the symbols in the first slot.

15. The apparatus according to claim 11, wherein the executable instructions, when executed by the at least one processor, further cause the apparatus to:
 obtain slot type indication information; and
 wherein determining the physical resource of the message comprises:
  determining, based on slot type indication information, the bandwidth part indication information, and the resource allocation information of the message, the physical resource of the message.

16. An apparatus, comprising:
 a non-transitory computer-readable storage medium including executable instructions; and
 at least one processor, wherein the executable instructions, when executed by the at least one processor, cause the apparatus to:
  obtain bandwidth part indication information and resource allocation information of a message, wherein the message comprises first data and second data;
  determine, based on the bandwidth part indication information and the resource allocation information of the message, a physical resource of the message, wherein the physical resource of the message comprises a first slot, a first frequency domain resource, and a second frequency domain resource;
  receive a first reference signal and the first data on a portion of symbols in the first slot and on the first frequency domain resource; and
  receive a second reference signal and the second data on a remaining portion of the symbols in the first slot and on the second frequency domain resource, wherein the second reference signal occupies the first symbol of the remaining portion of the symbols in the first slot.

17. The apparatus according to claim 16, wherein the bandwidth part indication information comprises indication of a bandwidth part occupied by the message, and a size of a bandwidth part in a carrier bandwidth carrying the message.

18. The apparatus according to claim 16, wherein the resource allocation information of the message comprises a resource allocation of the message within a bandwidth part occupied by the message.

19. The apparatus according to claim 16, wherein the second data occupies symbols other than the first symbol of the remaining portion of the symbols in the first slot.

20. The apparatus according to claim 16, wherein the executable instructions, when executed by the at least one processor, further cause the apparatus to:
 obtain slot type indication information; and
 wherein determining the physical resource of the message comprises:
  determining, based on slot type indication information, the bandwidth part indication information, and the resource allocation information of the message, the physical resource of the message.

* * * * *